US010446824B2

(12) United States Patent
Morita et al.

(10) Patent No.: US 10,446,824 B2
(45) Date of Patent: Oct. 15, 2019

(54) NONAQUEOUS ELECTROLYTE SECONDARY BATTERY

(75) Inventors: Masahiro Morita, Nisshin (JP); Yusuke Fukumoto, Moriguchi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 478 days.

(21) Appl. No.: 14/358,163

(22) PCT Filed: Nov. 15, 2011

(86) PCT No.: PCT/JP2011/076327
§ 371 (c)(1),
(2), (4) Date: May 14, 2014

(87) PCT Pub. No.: WO2013/073012
PCT Pub. Date: May 23, 2013

(65) Prior Publication Data
US 2014/0322600 A1      Oct. 30, 2014

(51) Int. Cl.
*H01M 2/34* (2006.01)
*H01M 4/13* (2010.01)
(Continued)

(52) U.S. Cl.
CPC ......... *H01M 2/348* (2013.01); *H01M 2/1653* (2013.01); *H01M 4/13* (2013.01);
(Continued)

(58) Field of Classification Search
CPC ............... H01M 2/621–623; H01M 2/667
See application file for complete search history.

(56) References Cited

U.S. PATENT DOCUMENTS

2005/0266305 A1    12/2005  Ohata et al.
2007/0264577 A1*   11/2007  Katayama ............ H01M 2/162
                                                                   429/246
(Continued)

FOREIGN PATENT DOCUMENTS

EP    2 378 592 A2    10/2011
JP    10-64549         3/1998
(Continued)

OTHER PUBLICATIONS

Machine translation of JP 2010003614 a, dated Jan. 7, 2010, retrieved Nov. 28, 2016.*

(Continued)

*Primary Examiner* — Robert S Carrico
(74) *Attorney, Agent, or Firm* — Finnegan, Henderson, Farabow, Garrett & Dunner, LLP

(57) ABSTRACT

A nonaqueous electrolyte secondary battery in accordance with the present invention is provided with an electrode body 20 including a positive electrode 30 and a negative electrode 50, and a nonaqueous electrode. The electrode body 20 is constituted by a plurality of different constituent members. At least two constituent members among the plurality of constituent members constituting the electrode body 20 include respective particulate polymers 38, 28 having a melting point within a temperature range from 80° C. to 120° C., with these two members being different from each other. The electrode body 20 is provided with the positive electrode 30 including a positive electrode active material layer 34 on a positive electrode collector 32, the negative electrode 50 including a negative electrode active material layer 54 on a negative electrode collector 52, separators 70A, 70B interposed between the positive electrode 30 and the negative electrode 50, and nonaqueous electrolyte. It is preferred that two or all of the positive electrode 30, the negative electrode 50, and the separators 70A, 70B include the particulate polymers 38, 78.

4 Claims, 6 Drawing Sheets

(51) Int. Cl.
*H01M 2/16* (2006.01)
*H01M 4/62* (2006.01)
*H01M 10/0525* (2010.01)
*H01M 10/42* (2006.01)

(52) U.S. Cl.
CPC ....... *H01M 4/622* (2013.01); *H01M 10/0525* (2013.01); *H01M 10/4235* (2013.01); *H01M 2200/10* (2013.01); *H01M 2220/20* (2013.01); *Y02E 60/122* (2013.01); *Y02T 10/7011* (2013.01)

(56) References Cited

U.S. PATENT DOCUMENTS

2008/0038631 A1* 2/2008 Nakura ................ H01M 2/145
429/144
2010/0159318 A1 6/2010 Sato et al.

FOREIGN PATENT DOCUMENTS

| JP | 2000-58065 | A | | 2/2000 |
|----|------------|---|---|--------|
| JP | 2000-149924 | | | 5/2000 |
| JP | 2006-179432 | A | | 7/2006 |
| JP | 2007-157723 | | | 6/2007 |
| JP | 2009-70606 | | | 4/2009 |
| JP | 2009176599 | A | * | 8/2009 |
| JP | 2010003614 | A | * | 1/2010 |
| JP | 2010-282849 | | | 12/2010 |
| KR | 10-2006-0122953 | A | | 11/2006 |
| KR | 10-2010-0017776 | A | | 2/2010 |

OTHER PUBLICATIONS

Maier, C. Calafut, T.. (1998). Polypropylene—The Definitive User's Guide and Databook—2 Morphology and Commercial Forms. (pp. 11-25). William Andrew Publishing/Plastics Design Library. (Year: 1998).*

* cited by examiner

NONAQUEOUS ELECTROLYTE SECONDARY BATTERY

CROSS-REFERENCE TO RELATED APPLICATIONS

This application is a national phase application of International Application No. PCT/JP2011/076327, filed Nov. 15, 2011, the content of which is incorporated herein by reference.

TECHNICAL FIELD

The present invention relates to a nonaqueous electrolyte secondary battery, and more particularly to a nonaqueous electrolyte secondary battery having a shutdown function with respect to abnormal heat generation in the battery.

BACKGROUND ART

Nonaqueous electrolyte secondary batteries (typically lithium ion batteries) have recently gained importance as high-output power sources for installation on vehicles and power supplies for power storage systems since these batteries are light-weighted and can provide high energy density. Various improvements have also been made to increase further the capacity and energy density of the batteries.

In the nonaqueous electrolyte secondary battery, a separator interposed between a positive electrode and a negative electrode is provided with a function of preventing short circuit caused by contact between the positive electrode and the negative electrode (short circuit preventing function) with the object of ensuring safety of the battery and the device where the battery is installed. In addition to the short circuit preventing function, the separator also increases the resistance by shutting down the ion conduction path when the temperature inside the battery reaches a predetermined temperature region (typically, the softening point or melting point of the separator). The separator is also provided with a function of stopping charge and discharge and preventing thermal ranway of the battery by such an increase in the resistance (shutdown function). In a typical separator, the melting point of the resin such as a polyolefin, which is a constituent material, is a shutdown temperature, and where the separator reaches this temperature, fine pores of the separator are closed by melting or softening, and the resistance is increased.

Various modes of the shutdown function of such nonaqueous electrolyte secondary batteries have been suggested. For example, Patent Literature 1 discloses a separator constituted by a porous film including a resin with a melting point within a range from 80° C. to 130° C., filler particles, and a porous substrate. It is indicated that with such a configuration, the separator can maintain stably the shape even in a high-temperature state above the melting point (shutdown temperature).

Patent Literature 2 discloses the configuration in which the positive electrode of a nonaqueous electrolyte secondary battery includes a binder together with a polymer compound with a melting point of 90° C. to 130° C. and a heat of melting equal to or greater than 30 μg as a heat absorber. It is indicated that with such a configuration, even when the Joule heat is generated by a short circuit, this heat is substantially absorbed by the heat absorber contained in the positive electrode active material layer as the heat of melting and, therefore, the increase in battery temperature can be inhibited.

CITATION LIST

Patent Literature

Patent Literature 1: Japanese Patent Application Publication No, 2007-157723
Patent Literature 2: Japanese Patent Application Publication No. 1110-064549

SUMMARY OF INVENTION

Technical Problem

However, the problem associated with the technique suggested in Patent Literature 1 is that where the content of the resin is increased to improve the shutdown function, the porosity of the porous membrane decreases and the battery output decreases. A similar problem is also associated with the technique suggested in Patent Literature 2. Thus, where the content of the polymer compound is increased, the ratio of the positive electrode active material decreases and the battery output decreases.

The present invention has been created to resolve the above described problems, and it is a main objective of the present invention to provide a nonaqueous electrolyte secondary battery in which significant loss in battery performance is prevented even when the shutdown function is improved.

Solution to Problem

The nonaqueous electrolyte secondary battery in accordance with the present invention is provided with an electrode body including a positive electrode and a negative electrode, and a nonaqueous electrolyte. In the nonaqueous electrolyte secondary battery, the electrode body is constituted by a plurality of different constituent members. At least two constituent members among the plurality of constituent members constituting the electrode body, include respective particulate polymers having a melting point within a temperature range from 80° C. to 120° C., with these two members being different from each other.

With such a configuration, the particulate polymers function as the so-called shutdown resins that shut down the ion conduction path and increase the internal resistance of the battery by melting at the melting point thereof. Further, in the nonaqueous electrolyte secondary battery disclosed herein, since the particulate polymers are included separately in two or more constituent members constituting the electrode body, the particulate polymers serving as the shutdown resins can be included in a larger amount in the entire battery while inhibiting the decrease in battery performance, and both the battery performance and the shutdown function can be improved.

In the preferred mode of the nonaqueous electrolyte secondary battery disclosed herein, the electrode body is provided with the positive electrode including a positive electrode active material layer on a positive electrode collector, the negative electrode including a negative electrode active material layer on a negative electrode collector, and a separator interposed between the positive electrode and the negative electrode. Two or all of the positive electrode, the negative electrode, and the separator include the particulate polymers.

The particulate polymer softens or melts when the temperature of the constituent member including the particulate polymer rises to the softening point or melting point thereof.

Therefore, since the particulate polymers are dispersedly included inside the battery in any two or all of the positive electrode, negative electrode, and the separator in the nonaqueous electrolyte secondary battery disclosed herein, the shutdown function can be demonstrated in a stepwise manner according to the position of the constituent member where the increase in temperature starts inside the battery and the timing thereof. As a result, it is possible to realize a nonaqueous electrolyte secondary battery in which the increase in battery temperature during abnormal heat generation can be prevented more reliably. For example, by increasing the resistance inside the battery and inhibiting charging and discharging from an early stage during abnormal heat generation, it is possible to prevent the accelerated advance in heat generation (thermal railway) in the battery.

In the preferred mode of the nonaqueous electrolyte secondary battery disclosed herein, the positive electrode has, as constituent members, the positive electrode collector, the positive electrode active material layer, and a conductive intermediate layer including a conductive material and a binder between the positive electrode collector and the positive electrode active material layer, as constituent members, and the separator has, as constituent members, a separator main body and a heat resistance layer including an inorganic filler and a binder on at least one surface of the main body. The particulate polymer is included at least in the conductive intermediate layer and the heat resistance layer from among the constituent members.

With such a configuration, the positive electrode can be provided with a shutdown function while preventing the degradation of battery characteristics such as battery capacity and battery resistance. Further, the separator can be imparted with a shutdown function demonstrated at a lower temperature. Furthermore, where the location of abnormal heat generation and the propagation mode of the generated heat are taken into account, the feature of compounding the particulate polymer in a combination of the conductive intermediate layer and heat resistance layer, among the various constituent members constituting the battery, advantageously raises the efficiency of increasing the internal resistance of the battery and the effect thereof.

In the preferred mode of the nonaqueous electrolyte secondary battery disclosed herein, the particulate polymer contained in the conductive intermediate layer and the particulate polymer contained in the heat resistance layer differ from each other, and the melting point of the particulate polymer contained in the conductive intermediate layer is lower than the melting point of the particulate polymer contained in the heat resistance layer. With such a configuration, the shutdown function demonstrated by the particulate polymer contained in the conductive intermediate layer of the positive electrode is initiated at a temperature lower than the initiation temperature of the shutdown function demonstrated by the particulate polymer contained in the heat resistance layer of the separator. Therefore, the internal resistance of the battery can be increased at an early stage after the abnormal heat generated in the positive electrode has started, and the shutdown function in the separator (heat resistance layer and separator main body) is thereafter demonstrated. As a result, the abnormal heat generation can be inhibited in a planned manner before thermal railway.

In the preferred mode of the nonaqueous electrolyte secondary battery disclosed herein, the ratio of the particulate polymer contained in the conductive intermediate layer is 10% by mass to 30% by mass, when the total content ratio of the conductive intermediate layer is 100% by mass. With such a configuration, by including the particulate polymer in the conductive intermediate layer, it is possible to include a large amount of the particulate polymer, without decreasing the content ratio of the positive electrode active material and excessively degrading the battery characteristics. Further, for example, by including the particulate polymer in the conductive intermediate layer, rather than dispersedly compounding the particulate polymer in the positive electrode active material layer, it is possible to shut down the conductive path more efficiently during the shutdown and the shutdown function can be demonstrated more effectively.

In the preferred mode of the nonaqueous electrolyte secondary battery disclosed herein, the ratio of the particulate polymer contained in the heat resistance layer is 10% by mass to 40% by mass, when the total content ratio of the heat resistance layer is taken as 100% by mass. With such a configuration, a large amount of the particulate polymer can be included without clogging the pores of the separator main body. Further, for example, by including the particulate polymer in the heat resistance layer, rather than dispersedly compounding the particulate polymer in the separator main body, it is possible to shut down the conductive path more efficiently during the shutdown and the shutdown function can be demonstrated more effectively.

In the preferred mode of the nonaqueous electrolyte secondary battery disclosed herein, the $D_{50}$ particle diameter of the inorganic filler contained in the heat resistance layer is 0.5 μm to 5.0 m, and the $D_{50}$ particle diameter of the particulate polymer is 0.1 μm to 3.0 μm. Further, the porosity of the separator including the heat resistance layer is 30% to 70%. With such a configuration, the shutdown behavior of the particulate polymer during abnormal heat generation is demonstrated early, and the dispersed state of the inorganic filler and particulate polymer in the heat resistance layer can be advantageously maintained. Further, good battery performance can be maintained without increasing the resistance of the entire separator.

In the preferred mode of the nonaqueous electrolyte secondary battery disclosed herein, the porosity of the entire separator is 30% to 70%. In the nonaqueous electrolyte secondary battery disclosed herein, in the separator the particulate polymer is disposed in the heat resistance layer, rather than in the separator main body. Therefore, the above described adequate porosity of the entire separator can be maintained. As a result, the shutdown function of the separator can be improved without reducing the porosity of the entire separator and degrading battery characteristics.

The effect demonstrated by the above described configurations can be maximized by using the configurations, for example, in a nonaqueous electrolyte secondary battery that has a high energy density and can be used at a high rate. A particularly advantageous application is to battery packs in which heat radiation can be easily impeded because a plurality of nonaqueous electrolyte secondary batteries is connected. Since such a nonaqueous electrolyte secondary battery has high safety during abnormal heat generation, as described hereinabove, it can be used as a power source, for example, for a hybrid vehicle, a plug in hybrid vehicle, and the like. Thus, a vehicle equipped with the nonaqueous electrolyte secondary battery disclosed herein is advantageously provided.

DESCRIPTION OF EMBODIMENTS

Figure 1:
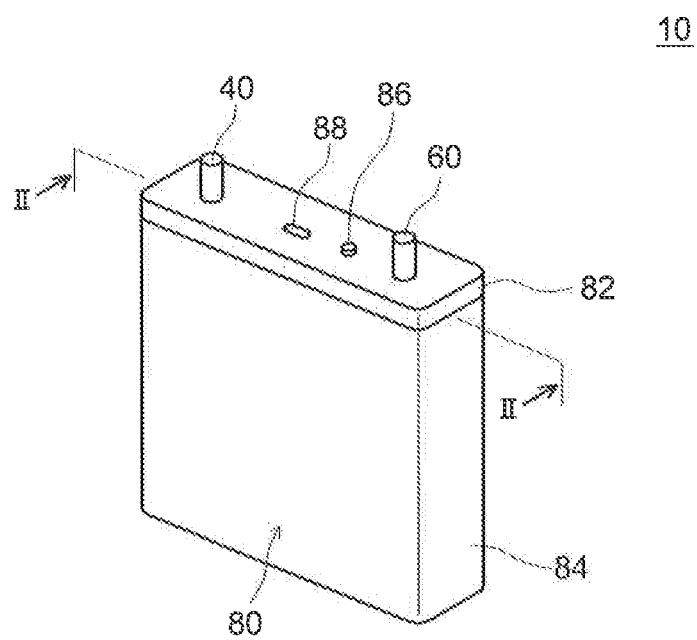
FIG. 1 is a perspective view showing schematically the external appearance of the lithium ion battery according to an embodiment.

The "secondary battery", as referred to in the present Description, is a general term for a repeatedly chargeable battery such as a lithium secondary battery and a nickel hydride battery. Further, the "lithium secondary battery", as referred to in the present Description, is a general term for a repeatedly chargeable battery using lithium ions as charge carriers, and is typically inclusive of a lithium ion battery and a lithium polymer battery.

Further, the "active material", as referred to in the present Description, means a substance that can reversibly store and release (typically, absorb and desorb) chemical species (for example, lithium ions in a lithium secondary battery) serving as charge carriers in a secondary battery.

Specific features of the nonaqueous electrolyte secondary battery according to the present invention are explained on the basis of a structural example of a lithium ion battery as an embodiment. In the drawings below, the members and parts demonstrating like effect are assigned with like reference numerals. The dimensional relationships (length, width, thickness, and the like) in the figures do not necessarily reflect actual dimensional relationships, unless specifically stated otherwise. Further, matters necessary for implementing the present invention (for example, materials and manufacturing methods of the active materials, separator main body, and electrolyte, general techniques relating to the construction of nonaqueous electrolyte secondary batteries, and the like), other than those specifically mentioned in the present Description, could be achieved as design matter by a person skilled in the art on the basis of the related art in the pertinent field.

Figure 2:
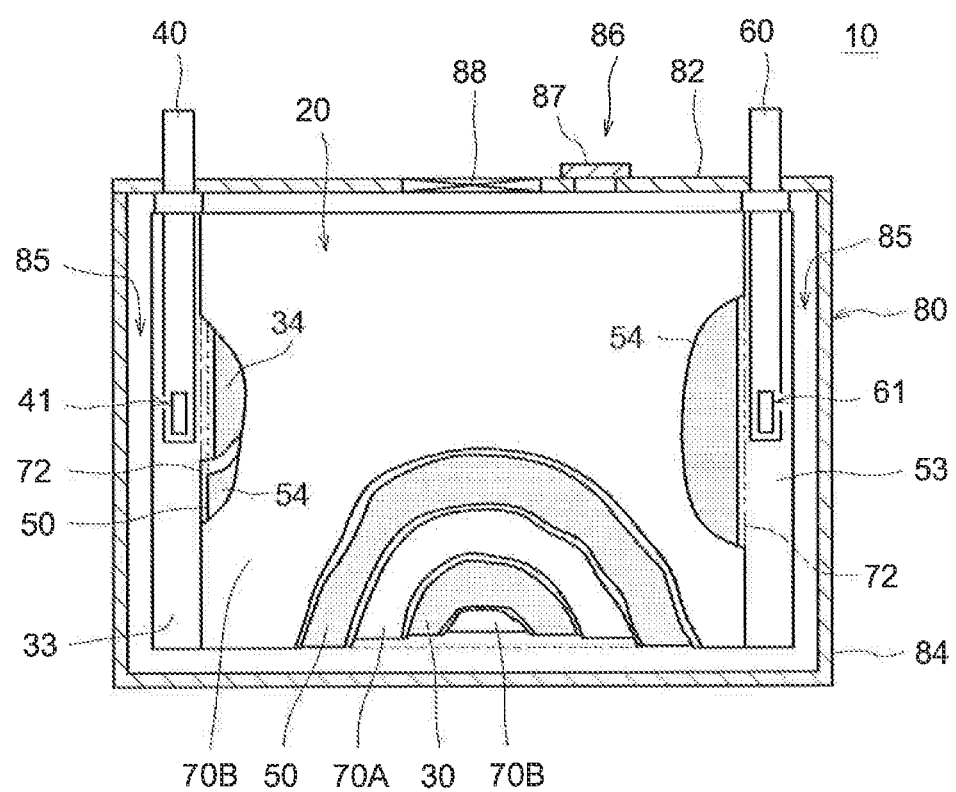
FIG. 2 is a cross sectional view taken along the II-II line in FIG. 1.
Figure 3:
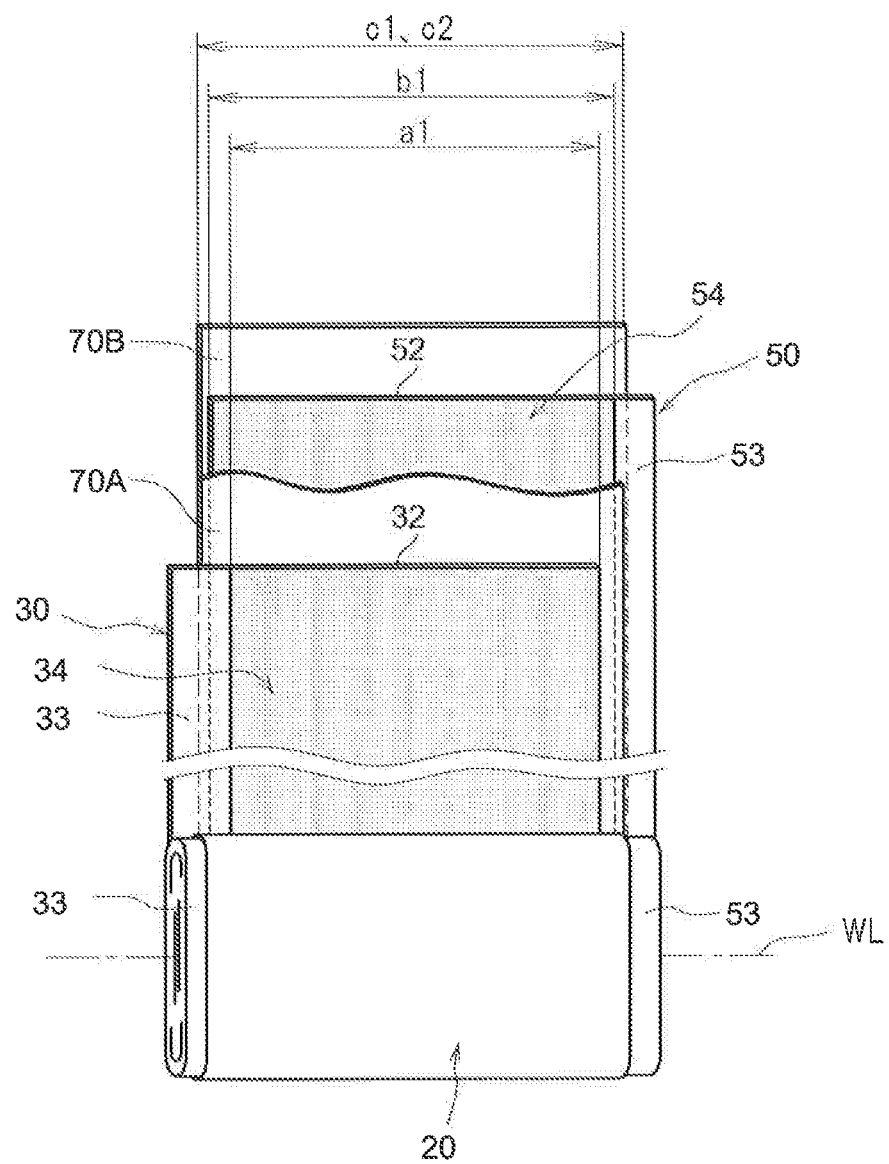
FIG. 3 is a schematic drawing showing a wound electrode body according to the embodiment.
Figure 4:
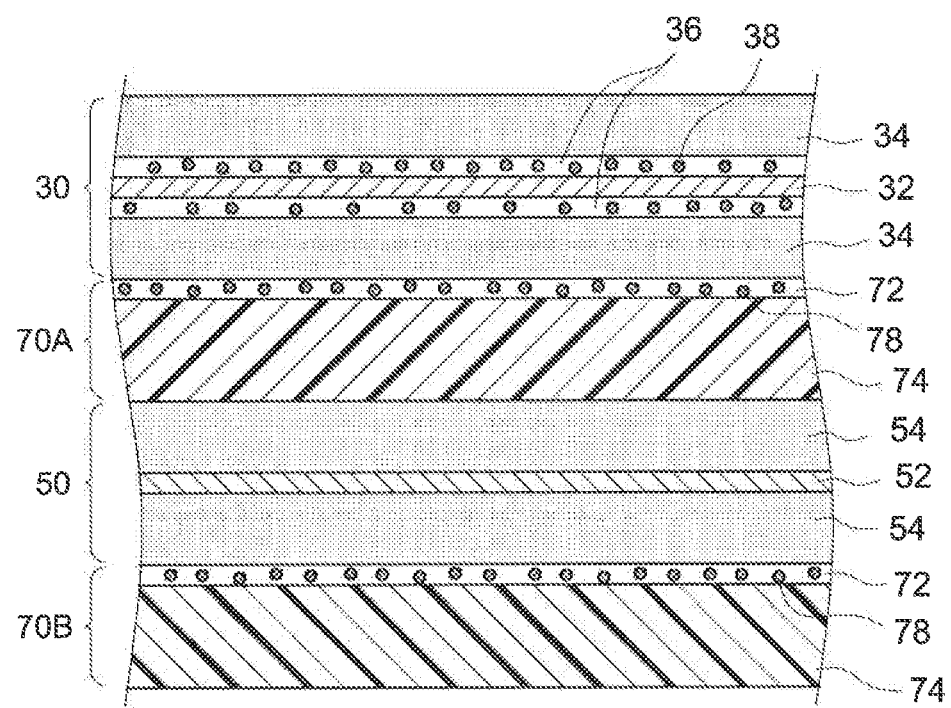
FIG. 4 is a partial cross sectional view showing the positive electrode, negative electrode, and separator constituting the wound electrode body according to the embodiment.

FIG. 1 is a perspective view showing the external appearance of a lithium ion battery 10. FIG. 2 is a cross sectional view taken along the II-II line in FIG. 1. As shown in FIG. 2, the lithium ion battery 10 is provided with a wound electrode body 20 and a battery case 80. FIG. 3 shows the configuration of the wound electrode body 20. FIG. 4 is a cross sectional view showing the structure of wound electrode body 20.

As shown in FIG. 3 and FIG. 4, the wound electrode body 20 is configured by overlapping a band-shaped positive electrode (referred to hereinbelow also as a positive electrode sheet) 30, a band-shaped negative electrode (referred to hereinbelow also as a negative electrode sheet) 50, and separators 70A, 70B, as constituent members thereof.

The positive electrode 30 is provided with a positive electrode collector 32 and a positive electrode active material layer 34 on the surface of the positive electrode collector 32, as constituent members thereof. The positive electrode 30 shown in FIG. 4 is also provided with a conductive intermediate layer 36 as a constituent member between the positive electrode collector 32 and the positive electrode active material layer 34. The conductive intermediate layer 36 is a functional layer acting to increase the electric conductivity between the positive electrode 30 and the positive electrode active material layer 34. The negative electrode 50 is provided with a negative electrode collector 52 and a negative electrode active material layer 54 on the surface of the negative electrode collector 52, as constituent members.

Separators 70A, 70B are porous members maintaining insulation of the positive electrode 30 and the negative electrode 50 and ensuring ion conductivity between the positive electrode 30 and the negative electrode 50. The separators 70A, 70B shown in FIG. 4 are provided with a separator main body 74 and a heat resistance layer (HRL) 72 on the surface thereof, as constituent members thereof. The heat resistance layer 72 is a porous body including an inorganic filler having heat resistance and is essentially a functional layer provided on one or both surfaces of the separators 70A, 70B in order to increase the heat resistance of the separators 70A, 70B with the object of preventing the internal short circuit of the separators 70A, 70B caused by the admixed metallic foreign matter, oxidation and decomposition, and degradation of battery characteristics.

For example, a body that has a laminated structure (for example, a three layer structure) obtained by laminating porous sheet-shaped polyolefin resins (typically, polypropylene (PP), polyethylene (PE), and the like) and can demonstrate a shutdown function of softening or melting and shutting down the electric current can be advantageously used as the separator main body 74.

Because of the manufacturing method thereof (for example, uniaxial stretching), a sheet-shaped polyolefin resin has a comparatively high melting point equal to or higher than about 130° C. The separator main body 74 constituted by such porous sheet-shaped polyolefin resin rapidly increases the internal resistance of a battery and Shuts down the electric current by melting during abnormal heat generation in a typical battery. However, for example, when the battery 10 has a high energy density characteristic, the heat radiation ability is lower than that of the typical battery due to such high energy density characteristic, the generated heat can be accumulated during overcharge, and the battery temperature can rapidly rise. Under such circumstances, even when the separator main body 74 melts and cuts off (shuts down) the electric current temporarily, the temperature of the battery 10 continues to rise and the heat resistance limit of the separators 70A, 70B can be exceeded.

Accordingly, in the lithium ion battery 10 disclosed herein, at least two constituent members among the plurality of constituent members constituting the wound electrode body 20, those two members being different from each other, include respective particulate polymers 38, 78 having a melting point within a temperature range from 80° C. to 120° C.

The particulate polymers 38, 78 are electrically insulating polymers and usually have a particulate form (with a smaller surface area). At a temperature equal to or higher than the above described melting point, the polymers melt, the surface area thereof is increased, and the ion conduction path is shut down, thereby increasing the internal resistance of the battery 10. Thus, the particulate polymers 38, 78 function as the so-called shutdown resin.

The melting point of the particulate polymers 38, 78 is set to a temperature range from 80° C. to 1.20° C. The melting point of the particulate polymers 38, 78 is set to be equal to or higher than 80° C. because the occurrence of abnormal heat generation in the lithium ion battery 10 can be determined by a state in which the battery temperature becomes equal to or higher than 80° C. The melting point of the particulate polymers 38, 78 is set to be equal to lower than 120° C. in order to demonstrate the shutdown function with the particulate polymers 38, 78 in advance of the shutdown function demonstrated by the sheet-shaped polyolefin resin in the above-described separators 70A, 70B. In order to determine the occurrence of abnormal heat generation more reliably and demonstrate the shutdown function sufficiently in advance of the shutdown function demonstrated by the sheet-shaped polyolefin resin of the separators 70A, 70B, it is more preferred that the melting point of the particulate polymers 38, 78 be within a temperature range from 90° C. to 110° C. With such a configuration, at least two constituent members constituting the above-described wound electrode body 20 can be provided with the shutdown function completely separately from and in advance of the shutdown function demonstrated by the sheet-shaped polyolefin resin of the separators 70A, 70B.

The constituent members including such particulate polymers 38, 78 are not limited to several constituent members described hereinabove by means of specific examples, and various other constituent members, which can constitute the wound electrode body 20, can be considered. The selection of the constituent members including the particulate polymers 38, 78 and combinations thereof are not particularly limited, and the particulate polymers 38, 78 can be disposed in the desired constituent members. For example, the particulate polymers 38, 78 may be disposed in two (or more than two) constituent members in the positive electrode 30, the particulate polymers 38, 78 may be disposed in two (or more than two) constituent members in the negative electrode 50, the particulate polymers 38, 78 may be disposed in two (or more than two) constituent members in the separators 70A, 70B, and it goes without saying that the particulate polymers may be disposed in any two of the positive electrode 30, negative electrode 50, and the separators 70A, 70B.

Among those options, in the preferred example of the lithium ion battery 10 disclosed herein, the particulate polymers 38, 78 are included in any two or all of the constituent members among the positive electrode 30, the negative electrode 50, and the separators 70A, 70B.

For example, more specifically, the particulate polymers 38, 78 can be included in the positive electrode active material layer 34, the negative electrode active material layer 54, and the separators 70A, 70B such as described hereinabove, or the particulate polymers can be included in various functional layers provided on the surface of the positive electrode collector 32, the negative electrode collector 52, and the separators 70A, 70B.

Since the particulate polymers 38, 78 are electrically insulating, where the amount thereof sufficient for a shutdown during abnormal heat generation caused by overcharging or the like is intended to be included in any one of the above-described constituent members, battery characteristics during usual use (for example, battery capacity and internal resistance) can be greatly degraded. Conversely, where the particulate polymers are to be included in any one of the above-described locations, without significantly degrading the battery characteristics during the usual use, the amount that can be compounded is restricted to a very small amount. Thus, the battery characteristics and shutdown performance require mutually opposite configurations, and the two requirements are difficult to fulfill at the same time. This becomes a particularly significant problem in the case of large batteries with poor heat radiation ability.

However, in the lithium ion battery 10, the particulate polymers 38, 78 are dispersedly included in any two or more of the above-described constituent members. As a result, a larger amount of particulate polymers 38, 78 can be included in the entire lithium ion battery 10, without compounding a large amount of the particulate polymers 38, 78 into a single constituent member which causes significant degradation of battery characteristics during the usual use. In addition, by disposing the particulate polymers 38, 78 in two or more constituent members inside the lithium ion battery 10, it is possible to demonstrate the shutdown function in a stepwise runner according to the position of the constituent member where the increase in temperature starts inside the battery 10 and the timing thereof.

With such a configuration, the particulate polymer 38 or 78 disposed in the constituent member which is closer to the location where the abnormal heat generation occurs due to overcharging or the like is the first to be melted, the internal resistance of the battery is increased from an early stage, and excessive accumulation of generated heat is inhibited. Then, the particulate polymers 38 or 78 disposed in the farther constituent member is melted and the internal resistance of the battery is further increased, thereby making it possible to inhibit the advance of overcharging. Where the internal resistance is thus increased from the initial stage of abnormal heat generation and the accelerated increase in temperature is prevented, the increase in temperature of the battery 10 can be prevented more reliably by the shutdown function demonstrated by the sheet-shaped polyolefin resin constituting the above-described separators 70A, 70B even when the temperature further rises.

In such lithium ion battery 10, the particulate polymers 38, 78 are preferably included at least in the conductive intermediate layer 36 of the positive electrode 30 and the heat resistance layer 72 of the separators 70A, 70B, as shown, for example, in FIG. 4.

When the particulate polymer 38 is contained in the positive electrode 30, where the particulate polymer is to be included in the positive electrode active material layer 34, the compounded amount of the positive electrode active material should be reduced according to the amount of the particulate polymer 38. Therefore, the compounding of the particulate polymer 38 directly affects the battery capacity, and the internal resistance of the battery 10 increases. As a consequence, it is difficult to include a sufficient amount of the particulate polymer 38 in the positive electrode active material layer 34. However, where the positive electrode 30 is provided with the conductive intermediate layer 36, and the particulate polymer 38 is included therein, the battery capacity does not decrease and the electric conductivity of the constituent member including the particulate polymer 38 can be also ensured.

Further, for example, where the separator main body 74 in the separators 70A, 70B is constituted by a sheet-shaped polyolefin resin, the separator main body 74 itself can be provided with the shutdown function. By providing the heat resistance layer 72 including the particulate polymer 78 on the surface of the separator main body 74, it is also possible to provide the shutdown function demonstrated by the heat resistance layer 72 separately from that of the separator main body 74. In this case, the melting point of the particulate polymer 78 is lower than that of the sheet-shaped polyolefin resin constituting the separator main body 74. Therefore, the shutdown by the separators 70A, 70B is initially demonstrated in the heat resistance layer 72, and then the separator main body 74 continuously ensured the shutdown at the subsequent stages.

The above-described conductive intermediate layer 36 and the heat resistance layer 72 typically have a thickness as small as about several microns (μm) (for example, less than 10 μm, typically about 1 to 7 μm). Therefore, even if the compounded amount of the particulate polymers 38, 78 is comparatively small, the particulate polymers 38, 78 can be dispersedly and uniformly disposed in those layers at a high compounding ratio. Therefore, during the abnormal heat generation, the shutdown behavior is demonstrated rapidly and a denser resistor with fewer breaks can be formed after the shutdown. In other words, the particulate polymers 38, 78 melt and form a resistor which is closer in Shape to a layer, and the internal resistance of the battery 10 can be efficiently increased.

Further, the abnormal heat generation typically occurs in the negative electrode 50 or the positive electrode 30, and the generated heat can propagate to the separators 70A, 70B. Therefore, with consideration for the position of the constituent members where the temperature starts increasing inside the battery 10, and the timing of such increase in temperature, it is preferred that the shutdown function be provided to at least a combination of the positive electrode 30 or the negative electrode 50 and the separators 70A, 70B, among the various constituent members constituting the battery 10. Furthermore, where the effect produced by the above-described conductive intermediate layer 36 or the heat resistance layer 72 is considered, it is more preferred that the particulate polymers 38, 78 be included in the combination of the conductive intermediate layer 36 of the positive electrode 30 and the heat resistance layer 72 of the separators 70A, 70B, because in this case the particulate polymers 38, 78 can function more effectively. In such a lithium ion battery 10, the propagation form of the heat generated inside the battery 10 is controlled in a more active and planned manner and the abnormal heat generation during overcharging is inhibited more reliably.

The same or mutually different particulate polymers may be used for the particulate polymer 38 contained in the conductive intermediate layer 36 and the particulate polymer 78 contained in the heat resistance layer 72. For example, polymers that differ in both the composition and the melting point may be used, and the polymers of the same composition that differ in the melting point may be also used. Concerning the particulate polymers 38, 78, it is preferred, for example, that the melting point of the particulate polymer 38 contained in the conductive intermediate layer 36 be lower than the melting point of the particulate polymer 78 contained in the heat resistance layer 72, but such a feature is not particularly limiting.

Such a relationship between the melting points is preferred because, as described hereinabove, the abnormal heat generation mostly occurs in the negative electrode 50 or the positive electrode 30, and the generated heat mainly propagates to the separators 70A, 70B. Therefore, it is preferred that the heat generation in the positive electrode 30 be inhibited at an earlier stage after the heat generation has been determined to be abnormal, that is, when the temperature of the positive electrode 30 is still comparatively low. As a result, the demonstration of the shutdown function by the particulate polymer 38 contained in the conductive intermediate layer 36 of the positive electrode 30 is started at a temperature lower than that at which the particulate polymer 78 contained in the heat resistance layer 72 of the separators 70A, 70B demonstrates the shutdown function, and the propagation of generated heat from the positive electrode 30 inside the battery 10 can be inhibited at an earlier stage. Further, the shutdown function of the particulate polymer 78 contained in the heat resistance layer 72 of the separators 70A, 70B is demonstrated after the shutdown function demonstrated by the particulate polymer 38 contained in the conductive intermediate layer 36 of the positive electrode 30, and the shutdown function of the separator main body 74 is then continuously demonstrated.

Figure 5:
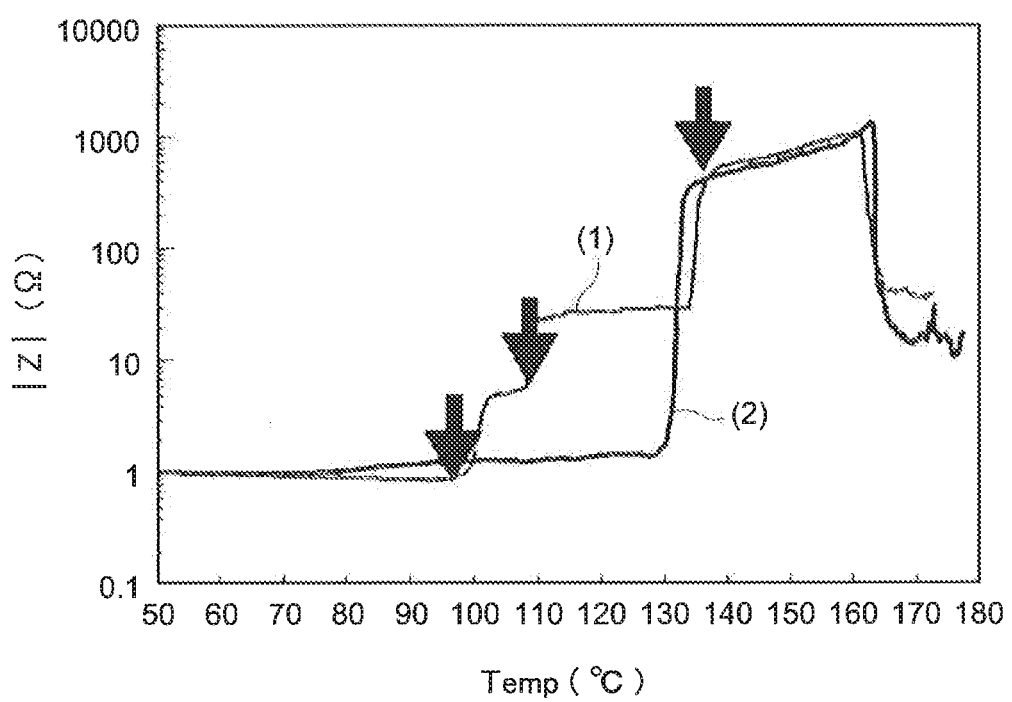
FIG. 5 shows changes in the internal resistance caused by the temperature of the lithium ion battery.
Figure 6:
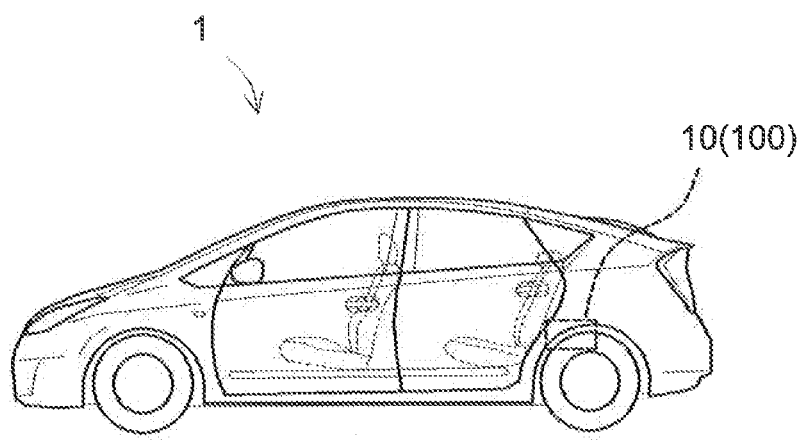
FIG. 6 is a side view showing a vehicle carrying the lithium ion battery according to the embodiment of the present invention.

FIG. 5 is a conceptual diagram explaining the shutdown behavior of a nonaqueous electrolyte secondary battery. The temperature inside the battery is plotted against the abscissa, and the internal resistance of the battery is plotted against the ordinate. Plot (1) in the figure shows how the internal resistance changes depending on the temperature of the nonaqueous electrolyte secondary battery disclosed herein, and plot (2) shows how the internal resistance changes depending on the temperature of the nonaqueous electrolyte secondary battery containing no particulate polymer.

Where the melting point of the particulate polymers 38, 78 is adjusted as described hereinabove, the internal resistance of the battery 10 changes, for example, as shown by plot (1). Thus, where the abnormal heat generation starts, the shutdown function of the particulate polymer 38 is initially demonstrated at the melting point (in FIG. 5, this temperature is shown by an arrow close to 100° C.) of the particulate polymer 38 contained in the conductive intermediate layer 36, and the internal resistance of the battery 10 increases. As a result, although the electric current is inhibited, the temperature of the battery 10 continues rising, and when the temperature rises to the melting point (in FIG. 5, this temperature is shown by an arrow close to 110° C.) of the particulate polymer 78 in the heat resistance layer 72, the particulate polymer 78 demonstrates the shutdown function. In this case, the internal resistance of the battery is further increased and the electric current is further inhibited. When the temperature of the battery 10 further rises and reaches the melting point (in FIG. 5, this temperature is shown by an arrow close to 130° C.) of the sheet-shaped polyolefin constituting the separator main body 74, the shutdown function is demonstrated by the sheet-shaped polyolefin, the internal resistance of the battery 10 greatly increases, and the electric current is shut down. As a result, chemical reactions in the battery 10 are stopped and the temperature of the battery 10 thereafter decreases gradually.

Meanwhile, in the battery 10 including no particulate polymers 38, 78, which is illustrated by plot (2), the internal resistance does not increase before the melting point of the sheet-shaped polyolefin resin is reached, even when the abnormal heat generation is started, and the shutdown function is demonstrated for the first time and the internal resistance of the battery 10 rapidly increases only at the melting point of the polyolefin. In the case of abnormal heat generation in a typical battery, where the battery current is shut down in this manner, the temperature of the battery 10 can thereafter decrease gradually as shown in plot (2). However, where the battery has a structure that can easily accumulate the generated heat, such as a large-scale battery structure, the battery temperature apparently can acceleratedly increase (the so-called thermal ranway) before the battery temperature reaches the melting point of the polyolefin. In such a case, the temperature continues to rise even after the electric current has been shut down and apparently can rise, for example, to 250° C. or higher, and even to above 300° C. Therefore, increasing the internal resistance of the battery 10 and inhibiting the electric current from an early stage before the thermal ranway is reached is a very effective method for preventing the initiation of thermal ranway in the case of abnormal heat generation.

The nonaqueous electrolyte secondary battery disclosed herein is prevented from reaching the thermal railway stage by performing the above-described steps (in a stepwise manner).

In such a lithium ion battery 10, the ratio of the particulate polymer 38 contained in the conductive intermediate layer 36 is preferably 10% by mass to 30% by mass, where the total content of the conductive intermediate layer 36, that is, in this particular case, the total amount of the conductive material, binder, and particulate polymer 38 contained in the conductive intermediate layer 36, is taken as 100% by mass.

The internal resistance of the battery 10 can be increased during the abnormal heat generation by including even a small amount of the particulate polymer 38 in the conductive intermediate layer 36, and the effect thereof increases with the increase in the compounded amount. However, at a compounded amount less than 10% by mass, the internal resistance is difficult to increase effectively during the abnormal heat generation. Meanwhile, where the compounded amount of the particulate polymer 38 exceeds 30% by mass, the internal resistance increases during the usual use of the battery 10 and the battery capacity decreases, which results in unnecessary degradation of battery characteristics. With this in view, it is desirable that the compounded amount of the particulate polymer 38 in the conductive intermediate layer 36 be about 10% by mass to 30% by mass, more preferably about 1.5% by mass to 20% by mass. As a result, the shutdown function of the particulate polymer 38 is demonstrated effectively in the conductive intermediate layer 36 and the abnormal heat generation in the battery 10 can be inhibited at an earlier stage.

Further, in the lithium ion battery 10, the ratio of the particulate polymer 78 contained in the heat resistance layer 72 is preferably 10% by mass to 40% by mass, where the total content of the heat resistance layer 72, that is, in this particular case, the total amount of the inorganic filler, binder, and particulate polymer 78 contained in the heat resistance layer 72, is taken as 100% by mass.

The internal resistance of the battery 10 can be increased during the abnormal heat generation by including even a small amount of the particulate polymer 78 in the heat resistance layer 72, and the effect thereof increases with the increase in the compounded amount. However, at a compounded amount less than 10% by mass, the internal resistance is difficult to increase effectively during the abnormal heat generation, and the temperature of the battery 10 rises to a comparative high level. Meanwhile, where the compounded amount of the particulate polymer 78 exceeds 40% by mass, the internal resistance increases during the usual use of the battery 10, which results in unnecessary degradation of battery characteristics. With this in view, it is desirable that the compounded amount of the particulate polymer 78 in the heat resistance layer 72 be about 10% by mass to 40% by mass, more preferably about 20% by mass to 30% by mass. As a result, the shutdown function of the particulate polymer 78 is demonstrated effectively in the heat resistance layer 72 and the abnormal heat generation in the battery 10 can be stopped at an earlier stage.

The average particle diameter of the inorganic filler contained in the heat resistance layer 72 is preferably 0.5 μm to 5.0 μm, and the average particle diameter of the particulate polymer is 0.1 μm to 3.0 μm. The "average particle diameter" as referred to herein means a particle diameter at an integrated value of 50% in the particle diameter distribution determined on a volume basis (can be referred to hereinbelow simply as average particle diameter or $D_{50}$) as measured by the laser diffraction scattering method. By setting the average particle diameter of the inorganic filler to 0.5 μm to 5.0 μm, it is possible to enhance further the effect demonstrated by the heat resistance layer 72 in preventing the oxidation and degradation of the separators 70A, 70B and degradation of battery characteristics. By setting the average particle diameter of the particulate polymer to 0.1 μm to 3.0 μm, it is possible to increase the reactivity of the particulate polymer during abnormal heat generation and further accelerate the melting thereof. Further, a more homogeneous and uniform dispersion state of the inorganic filler and particulate polymer in the heat resistance layer can be maintained and advantageous heat resistance layer 72 can be realized.

The porosity of the entire separator 70A, 70B in such lithium ion battery 10 is preferably from 30% to 70%. This porosity means a volume ratio of pores in the entire separator 70A, 70B including the heat resistance layer 72 and the separator main body 74. Since the heat resistance layer 72 is provided on the surface of the separators 70A, 70B, the heat resistance layer should have pores, in the same manner as the separators 70A, 70B, in order to ensure ion conductivity between the positive electrode 30 and the negative electrode 50. Accordingly, in order to ensure ion conductivity and prevent the resistance of the separators 70A, 70B from decreasing, it is preferred that the porosity of the entire separator 70A, 70B be equal to or greater than 30%. Further, in order to maintain the strength and durability of the separators 70A, 70B, it is preferred that the porosity be equal to or less than 70%. For example, it is more preferred that the porosity be from about 40% to 60%. The porosity can be advantageously controlled by adjusting the method for forming the heat resistance layer 72, or the particle diameter of the inorganic filler and the particulate polymer 78 contained in the heat resistance layer 72.

As described hereinabove, the particulate polymers 38, 78 that can be compounded without excessively degrading the characteristics of the lithium ion battery 10 are restricted in terms of the amount and compounding form thereof in the constituting members. Lu the lithium ion battery 10, as indicated hereinabove, the particulate polymers 38, 78 are dispersed and included in adequate amounts in at least the conductive intermediate layer 36 of the positive electrode 30 and the heat resistance layer 72 of the separators 70A, 70B. As a result, the amount of the particulate polymers 38, 78 used can be increased to the maximum limit amount which causes no degradation of characteristics of the battery 10, and the effectiveness of the shutdown performed by the particulate polymers 38, 78 can be maximized. Therefore, thermal ranway during the abnormal heat generation can be prevented more reliably.

By contrast, where the same shutdown function is attempted to be obtained only from the particulate polymer 78 included in the heat resistance layer 72 of the separators 70A, 70B, without compounding the particulate polymer 38 in the conductive intermediate layer 36 of the positive electrode 30, the ratio of the particulate polymer 78 in the heat resistance layer 72 should be made equal to or higher than 50% by mass. Such a compounded amount makes it difficult to maintain the separator porosity at or higher than 30% and binders the design. Conversely, for example, the same shutdown function cannot be obtained only from the particulate polymer 38 included in the conductive intermediate layer 36 of the positive electrode 30, without compounding the particulate polymer 78 in the heat resistance layer 72 of the separators 70A, 70B, because battery characteristics during the usual use are degraded. Therefore, in such lithium ion battery 10, the particulate polymers 38, 78 are included in the adequate state and adequate amounts in more adequate locations (constituent members) inside the battery 10.

The entire configuration of the nonaqueous electrolyte secondary battery disclosed herein will be explained below in greater detail on the example of the lithium ion battery 10, which is an embodiment, by referring, as appropriate, to FIG. 1 to FIG. 4. A typical method for manufacturing the nonaqueous electrolyte secondary battery will be also explained in a simple manner. The lithium ion battery 10 has a configuration in which the particulate polymers 38, 78 are included in the conductive intermediate layer 36 of the positive electrode 30 and the heat resistance layer of the separators 70A, 70B.

<<Positive Electrode>>

As described hereinabove, the positive electrode (positive electrode sheet) 30 is provided with the conductive intermediate layer 36 and the positive electrode active material layer 34 on the band-shaped positive electrode collector 32.

A metal foil suitable for positive electrodes can be advantageously used as the positive electrode collector 32. For example, a rod-shaped body, a plate-shaped body, a foil-shaped body, or a net-shaped body based on aluminum, nickel, titanium, or stainless steel can be used. In the embodiment, a band-shaped aluminum foil which has a thickness of about 1 μm and a predetermined width is used for the positive electrode collector 32. In the positive electrode collector 32, an uncoated portion 33 is provided along the edge on one side in the width direction. The conductive intermediate layer 36 and the positive electrode active material layer 34 are formed on both surfaces of the positive electrode collector 32, except for the uncoated portion 33 that has been set on the positive electrode collector 32.

The conductive intermediate layer 36 includes at least an electrically conductive material and the particulate polymer 38. In the present embodiment, the conductive intermediate layer 36 includes an electrically conductive material and the particulate polymer 38, and those components are fixedly attached to the above-described positive electrode collector 32 with a binder. The conductive intermediate layer 36 is typically formed by coating a composition including those electrically conductive material, particulate polymer 38, and binder on the positive electrode collector 32.

Various particulate materials with good electric conductivity can be used as the electrically conductive material. For example, a carbon powder can be advantageously used Specific examples include carbon powders such as various types of carbon black (for example, acetylene black, furnace black, graphitized carbon black, and Ketjen black), and graphite powder. Alternatively an electrically conductive metal powder such as a nickel powder may be used.

The composition of the particulate polymer 38 contained in the conductive intermediate layer 36 can be used without any particular limitation, provided that the particulate polymer has a melting point within a temperature range from 80° C. to 120° C. Such particulate polymer 38 melts and the surface area thereof is increased when the temperature of the conductive intermediate layer 36 rises, whereby the conduction path formed by the electrically conductive material is cut off. As a result, the internal resistance in the conductive intermediate layer 36 is increased, the movement of charge carriers (movement of the electrolytic solution) is restricted, and the reactions in the battery 10 are restricted (shutdown in the conductive intermediate layer 36).

A resin having the desired melting point and characteristics can be selected, as appropriate, for example, from polyolefin resins for use as the particulate polymer 38. It is preferred that one or two or more compounds be selected among polyethylene (PE) and ethylene-vinyl monomer copolymer, which can be easily procured and the melting point of which can be comparatively easily adjusted, for use as the particulate polymer 38. For example, the density of polyethylene (PE) and ethylene-vinyl monomer copolymer typically changes depending on the molecular weight and molecular structure, and the melting point can be controlled to the desired temperature by adjusting the density. Further, the ratio of the particulate polymer 38 in the conductive intermediate layer 36 may be from about 10% by mass to 30% by mass (weight as solids). The average particle diameter ($D_{50}$) of the particulate polymer 38 does not directly affect the characteristics of the battery and, therefore, is not particularly limited. However, from the standpoint of processability thereof, it is preferred that the average particle diameter be, for example, within a range from about 0.1 μm to 3.0 μm.

The binder acts to attach fixedly the above-described electrically conductive material and the particulate polymer 38 to each other, thereby forming the conductive intermediate layer 36, and also to attach fixedly the electrically conductive material and the particulate polymer 38 to the positive electrode collector 32.

A polymer soluble or dispersible in a solvent that is used when the conductive intermediate layer 36 is formed can be used as the binder. When the conductive intermediate layer 36 is formed by using an aqueous solvent, for example, water soluble or waster dispersible polymers can be advantageously used, specific examples thereof including cellulose polymers such as carboxymethyl cellulose (CMC) and hydroxypropyl methyl cellulose (HPMC), polyvinyl alcohol (PVA), fluororesins such as polytetrafluoroethylene (PTFE) and tetrafluoroethylene hexafluoropropylene copolymer (FEP), vinyl acetate copolymers, and rubbers such as styrene-butadiene rubber (SBR) and acrylic acid-modified SBR resin (SBR latex). When the conductive intermediate layer 36 is formed using a nonaqueous solvent, polymers such as polyvinylidene fluoride (PVdF), polyvinyl chloride (PVdC), and polyacrylonitrile (PAN) can be advantageously used. The melting point of those polymer materials is set substantially higher than that of the particulate polymer 38.

The conductive intermediate layer 36 can be formed, for example, by preparing a paste-like (slurry-like) composition in which the above-described electrically conductive material, particulate polymer 38, and binder are admixed to a solvent or vehicle, coating the composition on the positive electrode collector 32, and drying. In this case, an aqueous solvent or a nonaqueous solvent can be used as the solvent of the composition. N-methyl-2-pyrrolidone (NMP) is a typical advantageous example of the nonaqueous solvent. The polymer materials presented hereinabove by way of example as the binder can be also used with the object of demonstrating the functions of a thickening agent or other additives to the composition, in addition to the functions of the binder.

The positive electrode active material layer 34 includes at least the positive electrode active material. In the present embodiment, the positive electrode active material layer 34 includes a particulate positive electrode active material as the main component and also an electrically conductive material for increasing electric conductivity, and those components are fixedly attached with the binder to the above-described conductive intermediate layer 36. The positive electrode active material layer 34 is typically formed by coating the composition liar forming the positive electrode active material layer, which includes the positive electrode active material, electrically conductive material, and binder, on the conductive intermediate layer 36. Voids through which the electrolytic solution can permeate between the positive electrode active material particles is formed in the positive electrode active material layer 34 formed in the above-described manner.

Various substances suitable as the positive electrode active material for the lithium ion battery 10 can be used as the positive electrode active material. More specifically, a material capable of storing and releasing lithium can be used as the positive electrode active material, and one or two or more substances that have been conventionally used in lithium secondary batteries can be used without any particular limitation. Lithium transition metal oxides (typically particulate) can be advantageously used as the positive electrode active material. Typically an oxide of a layered structure or an oxide of a spinel structure can be selected, as appropriate, and used. For example, it is preferred that one or two or more lithium transition metal oxides selected from lithium nickel oxides (typically, $LiNiO_2$), lithium cobalt oxides (typically, $LiCoO_2$), and lithium manganese oxides (typically $LiMn_2O_4$) be used.

The "lithium nickel oxide", as referred to herein, means to be inclusive of oxides including Li and Ni as the constituent metal elements, and also of complex oxides including one or two or more other metal elements (that is, a transition metal element and/or a typical metal element other than Li and Ni) in addition to Li and Ni at a ratio less than that of Ni (when two or more metal elements other than Li and Ni are contained, the combined ratio thereof is less than that of Ni (calculated as the number of atoms)). Examples of such metal elements include one or two or more elements selected from the group consisting of Co, Al, Mn, Cr, Fe, V, Mg, Ti, Zr, Nb, Mo, W, Cu, Zn, Ga, In, Sn, La, and Ce.

Other suitable examples include a lithium-rich transition metal oxide in which lithium can be contained in excess in magnesium sites in the so-called ternary system including transition metal oxides of three types, such as represented by the general formula:

$$Li(Li_aMn_xCo_yNi_z)O_2$$ 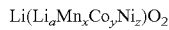

(a, x, y, and z in the formula satisfy the condition: a+x+y+z=1), and a lithium-rich transition metal oxide of the so-called solid solution type which is represented by the general formula:

$$xLi[Li_{1/3}Mn_{2/3}]O_2 \cdot (1-x)LiMeO_2$$ 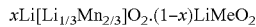

(Me in the formula is one or two or more transition metals, and x satisfies the condition: 0<x≤1). By using, for example, a lithium-rich transition metal oxide of a solid solution type as the positive electrode active material, it is possible to construct a lithium ion battery combining a high-output characteristic with a high-rate characteristic.

A polyanion compound represented by the general formula $LiMAO_4$ (herein M is at least one metal element selected from the group consisting of Fe, Co, Ni, and Mn; and A is an element selected from the group consisting of P, Si, S, and V) is another example of the positive electrode active material.

The compound constituting such positive electrode active material can be prepared, for example, by the well-known method. For example, raw material compounds selected, as appropriate, according to the target composition of the positive electrode active material are mixed at predetermined ratios, and the mixture is calcined by suitable means. As a result, it is possible to prepare, for example, an oxide as a compound constituting the positive electrode active material. The method for preparing the positive electrode active material (typically, a lithium transition metal oxide) does not by itself specify the present invention in any way.

For example, the shape of the positive electrode active material is not strictly limited, and the positive electrode active material prepared as described above can be ground, sieved, and classified by appropriate means. For example, a lithium transition metal oxide substantially constituted by secondary particles with an average diameter within a range from about 1 μm to 25 μm (typically, about 2 μm to 15 μm) can be advantageously used as the positive electrode active material in the technique disclosed herein. As a result, it is possible to obtain a particulate positive electrode active material powder substantially constituted by secondary particles having the desired average particle diameter and/or particle diameter distribution.

The electrically conductive material plays a role of ensuring a conductive path between the positive electrode active material, which does not have a high conductivity, and the positive electrode collector 32. Various conductive materials with good electric conductivity can be used as the electrically conductive material. For example, a carbon material such as a carbon powder or fiber-shaped carbon can be advantageously used. More specific examples include carbon powders such as carbon black of various types (for example, acetylene black, furnace black, graphitized carbon black, and Ketjen black) and graphite powder, and fiber-shaped carbon such as needle graphite and vapor-grown carbon fibers (VGCF). Those materials may be used individually or in combinations of two or more thereof. Alternatively, a conductive metal powder such as a nickel powder may be used.

A binder same as the binder used in the above-described conductive intermediate layer 36 can be used as the above-described binder. For example, typically, polymers such as carboxymethyl cellulose (CMC), styrene-butadiene rubber (SBR), and polyvinylidene fluoride (PVdF) can be advantageously used.

The positive electrode active material layer 34 can be formed by preparing a paste-like (slurry-like) composition for forming a positive electrode active material layer in which the above-described positive electrode active material and conductive material are mixed with a solvent or vehicle, coating the prepared composition on the conductive intermediate layer 36, drying, and rolling. In this case, an aqueous solvent or a nonaqueous solvent can be used as the solvent for the composition for forming the positive electrode active material layer. N-methyl-2-pyrrolidone (NMP) is typically the preferred example of the nonaqueous solvent. The polymer materials presented hereinabove by way of example as the binder can be also used with the object of demonstrating the functions of a thickening agent or other additives to the composition for forming the positive electrode active material layer, in addition to the functions of the binder.

For example, the amount of the electrically conductive material used is 1 part by mass to 20 parts by mass (preferably 5 parts by mass to 15 parts by mass) with respect to 100 parts by mass of the positive electrode active material, but this amount is not particularly limiting. The binder can be used in an amount of 0.5 parts by mass to 10 parts by mass with respect to 100 parts by mass of the positive electrode active material.

<<Negative Electrode>>

The negative electrode (negative electrode sheet) 50 is provided with the negative electrode active material layer 54, which includes a negative electrode active material, on the band-shaped negative electrode collector 52.

A metal foil suitable for negative electrodes can be advantageously used as the negative electrode collector 52. For example, a rod-shaped body, a plate-shaped body, a foil-shaped body, or a net-shaped body based on copper, nickel, titanium, or stainless steel can be used. In the example, a band-shaped copper foil which has a thickness about 10 μm and a predetermined width is used for the negative electrode collector 52. In the negative electrode collector 52, an uncoated portion 53 is set along the edge on one side in the width direction. The negative electrode active material layer 54 is formed on both surfaces of the negative electrode collector 52, except for the uncoated portion 53 that has been set on the negative electrode collector 52.

In the embodiment, the negative electrode active material layer 54 includes a particulate positive electrode active material as the main component, and the negative electrode active material is fixedly attached to the negative electrode collector 52 with a binder. The negative electrode active material layer 54 is typically formed by coating a composition for forming a negative electrode active material layer including the negative electrode active material and the binder on the negative electrode collector 52. Voids through which the electrolytic solution can permeate between the negative electrode active material particles is formed in the negative electrode active material layer 54 formed in the above-described manner.

Materials of one or two or more types that have been conventionally used in lithium ion batteries can be used without any particular limitations as the negative electrode active material. For example, a particulate carbon material (carbon particles) including, at least partially, a graphite structure (layered structure) can be used. More specifically, the negative electrode active material may be natural graphite, natural graphite coated with an amorphous carbon material, a graphite-like material (graphite), a hard graphitized carbon (hard carbon), a easily graphitized carbon (soft carbon), or a carbon material in which those materials are combined. Further, for example, metal compounds (preferably silicides and metal oxides) including Si, Ge, Sn, Pb, Al, Ga, In, As, Sb, and Bi as the constituent metal element may be also used. LTO (lithium titanate) can be also used as the negative electrode active material particles. In the negative electrode active material constituted by a metal compound, for example, the surface of the metal compound may be sufficiently coated by a carbon film to obtain a particulate material that excels in electric conductivity. In this case, the negative electrode active material layer may include no electrically conductive material, or the content ratio of the below-described electrically conductive material may be reduced with respect to that in the conventional configurations. Additional aspects of those negative electrode active materials and the form thereof, such as particle diameter, can be selected, as appropriate, according to the desired properties.

When an insulating material or a material with a low electric conductivity is used as the negative electrode active material, for example, the conductive intermediate layer 36 same as that provided in the positive electrode 30 can be provided between the negative electrode collector 52 and the negative electrode active material layer 54. Thus, for example, a particulate polymer having a melting point within a range from 80° C. to 120° C. may be included in the conductive intermediate layer. This also makes it possible to realize the lithium ion battery 10 in which the abnormal heat generation of the battery can be inhibited more reliably and safely.

The negative electrode active material layer 54 may include an electrically conductive material, but such a configuration is not particularly limiting. The electrically conductive material plays a role of ensuring a conductive path between the negative electrode active material, which does not have a high electric conductivity, and the negative electrode collector 52. An electrically conductive material of the positive electrode active material layer 34 can be similarly used as such an electrically conductive material.

Materials presented hereinabove by way of example as the binder, solvent, and thickening agent of the positive electrode active material layer 34 can be similarly used as the binder, solvent, and thickening agent of the negative electrode active material layer 54.

Any of the aqueous solvent and nonaqueous solvents suitable for the positive electrode active material layer 34 can be also used as the above-described solvent. N-methyl-2-pyrrolidone (NMP) is an example of the preferred nonaqueous solvent.

The polymer materials presented hereinabove by way of example as the binder of the positive electrode active material layer 34 can be also used with the object of demonstrating the functions of a thickening agent or other additives to the composition for forming the negative electrode active material layer, in addition to the functions of the binder.

The amount of the electrically conductive material used can be about 1 part by mass to 30 parts by mass (preferably about 2 parts by mass to 20 parts by mass, for example, about 5 parts by mass to 10 parts by mass) per 100 parts by mass of the negative electrode active material. The amount of the binder used can be, for example, 0.5 parts by mass to 10 parts by mass per 100 parts by mass of the negative electrode active material.

<<Separator>>

As shown in FIG. 2 to FIG. 4, the separators 70A, 70B are constituent members that insulate the positive electrode sheet 30 and the negative electrode sheet 50 and allow the electrolyte to move therethrough. In the example shown in FIG. 4, the separators 70A, 70B are provided with the heat resistance layer 72 on the surface on one side of the separator main body 74. The material constituting the separator main body 74 is essentially not limited, provided that the requirements placed on the separators 70A, 70B are met. Thus, a separator same as that used in the related art can be also used as the separator main body 74. Typically, porous bodies, nonwoven fabric-shaped bodies, fabric-shaped bodies having fine pores through which lithium ions can move can be used. For example, a porous sheet constituted by a resin (microporous resin sheet) can be advantageously used. Polyolefin resins such as polyethylene (PE), polypropylene (PP), and polystyrene are preferred as the constituent materials of such porous sheets. In particular, a porous polyolefin sheet such as a PE sheet, a PP sheet, a sheet of a two-layer structure in which a PE layer and a PP layer are laminated, a sheet of a three-layer structure in which a PE layer is sandwiched between two PP layers can be advantageously used. In this example, a band-shaped sheet material of a predetermined width having a plurality of fine holes is used as the separator main body 74. As shown in FIG. 2 to FIG. 4, the width hi of the negative electrode active material layer 54 is slightly larger than the width a1 of the positive electrode active material layer 34. The width c1, c2 of the separators 70, 72 is slightly larger than the width b1 of the negative electrode active material layer 54 (c1, c2>b1>a1). Such separator main body 74 is provided with a heat resistance layer including an inorganic filler on at least one surface. The porosity of the entire separator 70A, 70B including the heat resistance layer is preferably, for example, from 30% to 70% (more preferably from 40% to 60%). When a solid electrolyte or a gel-like electrolyte is used in the lithium ion battery 10 disclosed herein, the separator is sometimes unnecessary (that is, in this case, the electrolyte itself can function as a separator).

The thickness of the heat resistance layer 72 provided in the separators 70A, 70B is not particularly limited and generally can be equal to or less than 10 μm, typically 0.5 μm to 7 μm, more restrictedly from about 2 μm to 6 μm. The heat resistance layer 72 includes an inorganic filler, a particulate polymer 78 having a melting point within a temperature range from 80° C. to 120° C., and a binder. The melting point of the materials, other than the particulate polymer 78, that constitute the separators 70A, 70B (for example, in this particular case, the polyolefin fibers, inorganic filler, and binder as the separator material) is set higher than that of the particulate polymer 78. Therefore, where the lithium ion battery 10 generates heat for some reason and the temperature of the separators 70A, 70B reaches the melting point of the particulate polymer 78, the particulate polymer 78 contained in the separators 70A, 70B melts. The melted particulate polymer 78 closes the fine pores in the separators 70A, 70B and cuts off (shuts down) the ion conduction path of lithium ions, which are the charge carriers. As a result, the battery can be prevented, for example, from abnormal heat generation.

Various types of insulating materials can be used as the inorganic filler. For example, one or two or more materials selected from fillers such as metal oxides and metal hydroxides having electric insulation property, glass, various inorganic minerals, and inorganic dyes can be used. Specific examples include alumina ($Al_2O_3$), boehmite ($Al_2O_3 \cdot H_2O$), magnesia (MgO), mica, talc, titania, glass beads, and glass fibers. It is preferred that alumina ($Al_2O_3$), boehmite ($Al_2O_3 \cdot H_2O$), and magnesia (MgO) be used as the inorganic filler because they have stable quality and can be procured at a low cost. The average particle diameter ($D_{50}$) of the inorganic filler is desirably from 0.5 μm to 5.0 μm.

The composition of the particulate polymer that can be used as the particulate polymer 78 contained in the separators 70A, 70B is not particularly limited, provided that this particulate polymer has a melting point within the temperature range from 80° C. to 120° C. Such particulate polymer 78 melts and the surface area thereof increases when the temperature of the heat resistance layer 72 provided on the surface of the separators 70A, 70B becomes higher than the melting point of the particulate polymer 78, thereby filling the pores in the heat resistance layer 72 and the separators 70A, 70B and shutting down the conduction path. As a result, the internal resistance of the heat resistance layer 72 and the separators 70A, 70B is increased, the movement of the charge carrier (movement of the electrolytic solution) is inhibited, and the reactions in the battery 10 are restricted (shutdown in the heat resistance layer 72).

Such particulate polymer 78 can be selected, as appropriate, from the particulate polymers similar to the particulate polymer 38 in the above-described conductive intermediate layer 36. For example, the particulate polymer 78 may be identical to the particulate polymer 38 contained in the conductive intermediate layer 36 or may be different therefrom. Even when the materials have the same composition, the melting points thereof may differ from each other, Thus, the melting point of the particulate polymer 78 contained in the heat resistance layer 72 and the melting point of the particulate polymer 38 contained in the conductive intermediate layer 36 are each set within the temperature range from 80° C. to 120° C., but the melting points can be set independently from each other, From the standpoint of performing more effective shutdown, it is preferred that the melting point of the particulate polymer 78 contained in the heat resistance layer 72 be higher than the melting point of the particulate polymer 38 contained in the conductive intermediate layer 36.

The ratio of the particulate polymer 78 in the heat resistance layer 72 is preferably from about 10% by mass to 40% by mass (weight as solids). The average particle diameter ($D_{50}$) of the particulate polymer 38 does not directly affect the characteristics of the battery and, therefore, is not particularly limited. However, from the standpoint of processability thereof and the design of the heat resistance layer, it is preferred that the average particle diameter be, for example, within a range from about 0.1 μm to 3.0 μm. As a result, the shutdown function in the heat resistance layer 72 can be adjusted.

The heat resistance layer 72 can be formed, for example, by preparing a paste-like (slurry-like) composition in which the above-described inorganic filler, particulate polymer 78, and binder are admixed to a solvent or vehicle, coating the composition on the separators 70A, 70B, and drying. In this case, an aqueous solvent or a nonaqueous solvent can be used as the solvent of the composition. N-methyl-2-pyrrolidone (NMP) is a typical advantageous example of the nonaqueous solvent. The polymer materials presented hereinabove by way of example as the binder can be also used with the object of demonstrating the functions of a thickening agent or other additives to the composition, in addition to the functions of the binder. For example, the mass ratio of the binder in the heat resistance layer can be set to a desired value within a range from 1% by mass to 60% by mass, but this range is not particularly limiting. The ratio of solids in the composition for forming the heat resistance layer can be, for example, from about 30% by mass to 50% by mass. The ratio of solids is typically about 40% by mass in a solvent system and 50% by mass to 52% by mass in an aqueous system. It goes without saying that the amount of binder and the ratio of solids are not limited to the above-described numerical values.

<<Battery Case>>

As shown in FIG. 1, in the present example, a battery case 80 is the so-called angular battery case, which is provided with a container main body 84 and a lid 82. The container main body 84 is a flat box-shaped container that has a bottomed quadrangular tubular shape open at one side surface (upper surface). The lid 82 is a member that is mounted on the opening (opening of the upper surface) of the container main body 84 and closes the opening.

In a secondary battery to be installed on a vehicle, it is desirable that the weight energy efficiency (battery capacity per unit weight) be increased in order to improve fuel efficiency of the vehicle. Therefore, in the present embodiment, a lightweight metal such as aluminum or an aluminum alloy is used for the container main body 84 and lid 82 constituting the battery case 80. As a result, the weight energy efficiency can be increased.

The battery case 80 has an inner space of a flat rectangular shape as the space for accommodating the wound electrode body 20. Further, as shown in FIG. 2, the flat inner space of the battery case 80 is slightly wider than the wound electrode body 20. Further, a positive electrode terminal 40 and a negative electrode terminal 60 are attached to the lid 82 of the battery case 80. The positive electrode terminal 40 and the negative electrode terminal 60 are led through the battery case 80 (lid 82) to the outside of the battery case 80. A safety valve 88 is provided in the lid 82.

The wound electrode body 20 has the band-shaped positive electrode sheet 30 and negative electrode sheet 50 and the separators 70A, 70B.

When the wound electrode body 20 is fabricated, the positive electrode sheet 30 and the negative electrode sheet 50 are laminated with the separators 70A, 70B being interposed therebetween. The positive electrode sheet 30 and the negative electrode sheet 50 are overlapped with a certain displacement in the width direction such that the uncoated portion 33 of the positive electrode active material layer 34 of the positive electrode sheet 30 and the uncoated portion 53 of the negative electrode active material layer 54 of the negative electrode sheet 50 project in respective directions from both sides in the thickness direction of the separators 70A, 70B, The flat wound electrode body 20 can be fabricated by winding the laminate with the electrode sheets overlapped in such a manner and collapsing the obtained wound body by applying a pressure from the side surface direction.

A winding core portion (that is, the portion Where the positive electrode active material layer 34 of the positive electrode 30, the negative electrode active material layer 54 of the negative electrode sheet 50, and the separators 70A, 70B are tightly laminated) is formed in the center portion in the direction of the winding axis (WL) of the wound electrode body 20. Further, at both ends of the wound electrode body 20 in the winding axis direction, the uncoated portions 33 and 53 of the positive electrode sheet 30 and the negative electrode sheet 50 project to the outside from the winding core portion. A positive electrode lead terminal 41 and a negative electrode lead terminal 61 are provided at the projecting portion on the positive electrode side (that is, a portion where the positive electrode active material layer 34 is not formed) and the projecting portion on the negative electrode side (that is, a portion where the negative electrode active material layer 54 is not formed) and electrically connected to the above-described positive electrode terminal 40 and negative electrode terminal 60, respectively. In this case, due to the difference in materials, for example, ultrasonic welding is used for connecting the positive electrode terminal 40 and the positive electrode collector 32. Further, for example, resistance welding is used for welding the negative electrode terminal 60 and the negative electrode collector 52, As shown in FIG. 2, such wound electrode body 20 is accommodated in the flat inner space of the container main body 84. After the wound electrode body 20 has been accommodated, the container main body 84 is closed with the lid 82. A joint of the lid 82 and the container main body 84 is sealed, for example, by laser welding. Thus, in the present example, the wound electrode body 20 is aligned inside the battery case 80 by the positive electrode terminal 40 and the negative electrode terminal 60 fixed to the lid 82 (battery case 80).

<<Electrolytic Solution>>

Then, an electrolytic solution is poured into the battery case 80 from a pouring hole 86 provided in the lid 82. One or two or more nonaqueous electrolytic solutions that have been used in the conventional lithium secondary batteries can be used without any particular limitation as the electrolytic solution to be used herein. Such nonaqueous electrolytic solution typically has a composition including an electrolyte (that is, a lithium salt) in an appropriate non-aqueous solvent. The concentration of the electrolyte is not particularly limited, but it is preferred that a nonaqueous electrolytic solution be used that includes an electrolyte at a concentration about 0.1 mol/L to 5 mol/L (preferably about 0.8 mol/L to 1.5 mol/L), A solid (gel-like) electrolytic solution obtained by adding a polymer to such liquid electrolytic solution may be also used.

Aprotic solvents such as carbonates, esters, ethers, nitriles, sulfones, and lactones can be used as the nonaqueous solvent. Specific examples thereof include ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethylsulfoxide, sulfolane, and γ-butyrolactone.

Examples of electrolytes include $LiPF_6$, $LiBF_4$, $LiN(SO_2CF_3)_2$, $LiN(SO_2C_2F_5)_2$, $LiCF_3SO_3$, $LiC_4F_9SO_3$, $LiC(SO_2CF_3)_3$, and $LiClO_4$.

A compound which has an oxidation potential equal to or higher than the operation voltage of a lithium secondary battery (for example, equal to or higher than 4.2 V in the case of a lithium secondary battery that is fully charged at 4.2 V) and which generates a large amount of gas on oxidation can be used without any particular limitation as an overcharge preventing agent to be included in the electrolytic solution, but where the oxidation potential approaches the operation voltage of the battery, gradual decomposition can be induced by, for example, local voltage increase even at the usual operation voltage. Meanwhile, where the decomposition voltage becomes equal to or higher than 4.9 V, thermal railway can be caused by the reaction of the main components of the nonaqueous electrolytic solution and the electrode material prior to gas generation caused by oxidation and decomposition of the additive. Therefore, in a lithium secondary battery that reaches a fully charged state at 4.2 V, it is preferred that an additive be used that has an oxidation reaction potential within a range from 4.6 V to 4.9 V. Examples of suitable compounds include biphenyl compounds, cycloalkylbenzene compounds, alkylbenzene compounds, organophosphorus compounds, fluorine-atom-substituted aromatic compounds, carbonate compounds, cyclic carbonate compound, and alicyclic hydrocarbons. More specific examples include biphenyl (BP), alkyl biphenyls, terphenyl, 2-fluorobiphenyl, 3-fluorobiphenyl, 4-fluorobiphenyl, 4,4'-difluorobiphenyl, cyclohexylbenzene (CHB), trans-butylcyclohexylbenzene, cyclopentylbenzene, t-butylbenzene, t-aminobenzene, o-cyclohexylfluorobenzene, p-cyclohexylfluorobenzene, tris-(t-butylphenyl)phosphate, phenyl fluoride, 4-fluorophenyl acetate, diphenyl carbonate, methylphenyl carbonate, bis-tertiary-butylphenyl carbonate, diphenyl ether, and dibenzofuran. It is particularly preferred that cyclohexylbenzene (CHB) and cyclohexylbenzene derivatives be used. The amount of the overcharge preventing agent to be used per 100% by mass of the electrolytic solution used can be, for example, about 0.01% by mass to 10% by mass (more preferably about OA % by mass to 5% by mass).

In the present example, the electrolytic solution is obtained by including $LiPF_6$ at a concentration of about 1 mol/L into a mixed solvent of ethylene carbonate and diethyl carbonate (for example, a mixed solvent with a volume ratio of components of about 1:1). Then, a metallic sealing cap 87 is attached (for example, welded) to the pouring hole and the battery case 80 is sealed.

<<Voids>>

In such a configuration, the positive electrode active material layer 34 and the negative electrode active material layer 54 have fine gaps, which should also be called cavities, between the particles of the electrode active materials and the electrically conductive material. The electrolytic solution (not shown in the figure) can permeate into those fine gaps. Here, the gaps (cavities) are appropriately called "voids". Thus, the electrolytic solution permeates the positive electrode active material layer 34 and the negative electrode active material layer 54 inside the lithium ion battery 10.

<<Venting Paths>>

Further, in the present example, the flat inner space of the battery case 80 is slightly larger than the wound electrode body 20 deformed into the flat shape. A gap 85 is provided between the wound electrode body 20 and the battery case 80 at both sides of the wound electrode body 20. The gaps 85 serve as gas vent paths. Where the temperature of the lithium ion battery 10 rises abnormally, for example, when overcharge occurs, the electrolytic solution is decomposed and an abnormal amount of gas can be generated. In the present embodiment, the abnormally generated gas passes through the gaps 85 between the wound electrode body 20 and the battery case 80 at both sides of the wound electrode body 20 and also through the safety valve 88 and is smoothly released to the outside of the battery case 80.

In such a lithium ion battery 10, the positive electrode collector 32 and the negative electrode collector 52 are electrically connected to an external device through the electrode terminals 40, 60 passing through the battery case 80. As a result, it is possible to provide the lithium ion battery 10 serving as a nonaqueous electrolyte secondary battery.

In the lithium ion battery 10 disclosed herein, it is important that the particulate polymers 38, 78, which are shutdown resins, be dispersedly contained in at least two constituent members among the positive electrode 30, negative electrode 50, and separators 70A, 70B. With such a configuration, for example, even when abnormal heat generation caused by overcharge or the like occurs in the lithium ion battery 10 which is provided with a high energy density characteristic and is inferior in terms of heat radiation ability to the typical battery, the particulate polymer contained in the constituent member that is closer to the location where the abnormal heat generation has occurred is melted, the internal resistance of the battery is increased from an early stage, and the particulate polymer contained in the further constituent member is then melted, thereby preventing the accumulation of generated heat that can lead to thermal railway. Further, since the particulate polymers are dispersedly included in a plurality of constituent members, the shutdown function is effectively demonstrated without excessive degradation of battery characteristics.

The above-descried configuration can be advantageously used in a lithium ion battery 10 having a high energy density and suitable for use at a high rate. In such a case, the effect of the above-described configuration can be maximized. This configuration can be particularly advantageously used in a battery pack 100 in which heat radiation is made difficult by connection of a plurality of lithium ion batteries 10. Thus, as described hereinabove, the lithium ion battery 10 disclosed herein has high safety during abnormal heat generation and, therefore, can be used as a power source, for example, in hybrid vehicles and plug-in hybrid vehicles. For example, a vehicle 1 equipped with the lithium ion battery 10 disclosed herein can be advantageously provided.

The present invention will be explained below in greater detail based on examples thereof, but the present invention is not intended to be limited to the features shown in those examples.

<Sample 1>

[Positive Electrode]

A composition for forming a conductive intermediate layer was prepared by compounding AB (acetylene black) as an electrically conductive material, PVdF as a binder, and polyethylene ($D_{50}$=0.3 m, melting point 97° C.) as a particulate polymer in a manner such that the mass ratio of those materials represented by (electrically conductive material):(binder):(particulate polymer) was 30:50:20, and dispersing the compounded materials in N-methyl-2-pyrrolidone (NMP) as a solvent. The solid materials were dispersed by stirring for 25 min at a revolution speed of 20,000 rpm by using an ultraprecise dispersion emulsifier (CREAMIX, manufactured M Technique Co., Ltd.).

A composition for a positive electrode active material layer was prepared by compounding $LiNi_{1/3}Co_{1/3}Mn_{1/3}O_2$ as a positive electrode active material, AB (acetylene black) as an electrically conductive material, and PVdF as a binder in a manner such that the mass ratio of those materials represented by (positive electrode active material):(electrically conductive material):(binder) was 93:4:3 and dispersing the compounded materials in N-methyl-2-pyrrolidone (NMP) as a solvent. The solid materials were dispersed by stirring for 25 min at a revolution speed of 20,000 rpm by using an ultraprecise dispersion emulsifier (CREAMIX, manufactured M Technique Co., Ltd.).

A positive electrode (positive electrode sheet) was fabricated by coating the above-described composition for forming a conductive intermediate layer on both surfaces of an aluminum (Al) foil with a thickness of 15 µm as a collector with a gravure coater so as to obtain a thickness of 2 µm (per one side), drying, then coating the above-described composition for forming a positive electrode active material layer on the conductive intermediate layer on both surfaces, drying, and then pressing to a total thickness of 170 µm. The positive electrode was cut to a length of 4,500 mm and provided for battery assembling.

[Negative Electrode]

To obtain a negative electrode, a composition for forming a negative electrode active material layer was prepared by compounding graphite as a negative electrode active material, SBR as a binder, and CMC as a thickening agent in a manner such that the mass ratio of those materials represented by (negative electrode active material):(binder):(thickening agent) was 98:1:1, and dispersing the compounded materials in water as a solvent. A negative electrode was fabricated by coating the composition for forming a negative electrode active material on both surfaces of a copper (Cu) foil with a thickness of 20 µm as a collector, drying, and then pressing to a total thickness of 150 µm. The negative electrode was cut to a length of 4,700 mm and provided for battery assembling.

[Separator]

A composition for forming a heat resistance layer was prepared by compounding alumina ($D_{50}$=0.7 µm) as an inorganic filler, PVdF as a binder, and polyethylene ($D_{50}$=0.8 µm, melting point 100° C.) as a particulate polymer in a manner such that the mass ratio of those materials represented by (inorganic filler):(binder):(particulate polymer) was 71:4:25, and dispersing the compounded materials in NMP as a solvent. The solid materials were dispersed by stirring for 25 min at a revolution speed of 20,000 rpm by using an ultraprecise dispersion emulsifier (CREAMIX, manufactured M Technique Co., Ltd.).

A porous film of a three-layer structure having a thickness of 25 μm and constituted by polypropylene (PP)/polyethylene (PE)/polypropylene (PP) was used as the separator.

The composition for forming a heat resistance layer was coated on one surface of the separator with a gravure coater to obtain a thickness of 5 μm and dried to form the heat resistance layer on the separator. Two such separators were prepared.

[Electrolyte]

A nonaqueous electrolytic solution was prepared by introducing $LiPF_6$ as a support salt to a concentration of about 1 mol/L into a mixed solvent including ethylene carbonate (EC), dimethyl carbonate (DMC), and ethyl methyl carbonate (EMC) at a volume ratio of 3:4:3.

[Construction of Lithium Ion Battery]

A flat wound electrode body was fabricated by laminating the above-described positive electrode and negative electrode, with the two separators being interposed therebetween, winding, and collapsing the wound body from the side surface direction. A lithium ion battery for evaluation was constructed by accommodating the wound electrode body, which was obtained in the above-described manner, together with the electrolytic solution in a metallic box-like battery case, and air-tightly sealing the opening in the battery case.

<Sample 2>

A positive electrode and separators were prepared in the same manner as in Sample 1, except that the particulate polymer was not included in the conductive intermediate layer of the positive electrode or the heat resistance layer of the separators, and a lithium ion battery was then constructed in the same manner.

Thus, the positive electrode provided with the conductive intermediate layer and having a mass ratio of the materials in the composition for forming the conductive intermediate layer of (electrically conductive material):(binder):(particulate polymer) of 50:50:0 was prepared.

The separators provided with the heat resistance layer and having a mass ratio of the materials in the composition for forming the heat resistance layer of (inorganic filler):(binder):(particulate polymer) of 96:4:0 were fabricated.

<Sample 3>

A positive electrode was prepared in the same manner as in Sample 1, except that the particulate polymer was not included in the conductive intermediate layer of the positive electrode, and a lithium ion battery was then constructed in the same manner.

Thus, the positive electrode provided with the conductive intermediate layer and having a mass ratio of the materials in the composition for forming the conductive intermediate layer of (electrically conductive material):(binder):(particulate polymer) of 50:50:0 was prepared and provided for battery construction.

<Sample 4>

Separators were prepared in the same manner as in Sample 1, except that the particulate polymer was not included in the heat resistance layer of the separators, and a lithium ion battery was then constructed in the same manner.

Thus, the separators provided with the heat resistance layer were prepared by compounding the materials in the composition for forming the heat resistance layer to obtain a mass ratio of (inorganic filler):(binder):(particulate polymer) of 96:4:0 and the prepared separators were provided for battery construction.

[Continuous Overcharge Test]

The lithium ion batteries (Samples 1 to 4) for evaluation that were constructed in the above-described manner were subjected to appropriate conditioning treatment (initial charge-discharge treatment in which the operation of charging at a constant current and a constant voltage to 4.1 V at a charge rate of 0.1 C and the operation of discharging at a constant current and a constant voltage to 3.0 V at a discharge rate of 0.1 C were repeated three times).

The batteries adjusted to SOC 100% were then CC-CV charged by charging to a charge upper-limit voltage of 20 V at a rate of 48 A (corresponds to 2 C) at a temperature of 25° C. and then charged to SOC 200% at 20 V. In this case, a thermocouple was attached to the side surface of the battery case of each battery, the temperature of the battery case was measured, and the battery voltage was also measured.

As a result, the temperature at which the shutdown has started was taken as a SD start temperature (° C.), and the highest reached temperature of the battery case was taken as a maximum reached temperature (° C.). Those temperatures are shown in Table 1. The temperature behavior of the batteries was also observed for at least 5 minutes in the case in which the shutdown was caused by the separator itself and the conduction was impossible. The results are shown in Table 1.

TABLE 1

| Sample | Particulate polymer | | Battery temperature | | Maximum reached temperature (° C.) |
| | Heat resistance layer | Conductive intermediate layer | behavior when conduction is impossible | SD start temperature (° C.) | |
| --- | --- | --- | --- | --- | --- |
| 1 | Present | Present | Gradual decrease | 89 | 120 |
| 2 | Absent | Absent | Abnormal heat generation | 130 | 350 |
| 3 | Present | Absent | Abnormal heat generation | 95 | 295 |
| 4 | Absent | Present | Abnormal heat generation | 110 | 280 |

As shown in Table 1, in the battery of Sample 1 according to the invention disclosed herein, the SI) start temperature was the lowest (89° C.) as the battery surface temperature, and the maximum reached temperature of the battery surface was the lowest (120° C.). Thus, where the shutdown function was imparted to both the positive electrode and the separator, the battery resistance was initially increased at an earlier stage and subsequent overdischarge and accumulation of generated heat were inhibited, and then the internal resistance further increased in a stepwise manner, thereby making it possible to stop the electric current reliably. In the battery of Sample 1, the abnormal heat generation could be actively controlled from an early stage of heat generation and the heat generation could be inhibited very safely.

By contrast, the battery of Sample 2 was not provided with the shutdown function realized by the particulate polymer, the initiation of shutdown performed by the separator itself was delayed, and the battery temperature was as high as 130° C. For this reason, the accelerated increase in battery temperature has already begun when the shutdown was started, the battery temperature continued rising even after the conduction was made impossible, and the maximum reached temperature was as high as 350° C.

Further, in the battery of Sample 3, only the heat resistance layer was provided with the shutdown function demonstrated by the particulate polymer (melting point 100° C.). The shutdown by the heat resistance layer started at a temperature of 95° C. of the battery surface, that is, with a certain delay. Although the shutdown start temperature was lower than in the battery of Sample 2, the battery temperature has already started increasing acceleratedly, the battery temperature continued rising even after the conduction was made impossible, and the maximum reached temperature was as high as 295° C. Where the shutdown function realized by the particulate polymer is imparted only to the heat resistance layer, the shutdown start temperature and maximum reached temperature are somewhat lowered and a certain effect is observed. However, heat generation cannot be inhibited at an early stage and the effect such as complete prevention of thermal=way is not obtained.

In the battery of Sample 4, the shutdown function demonstrated by the particulate polymer (melting point 94° C.) was imparted to the conductive intermediate layer. The shutdown by the conductive intermediate layer was started at a rather high temperature of 110° C. of the battery surface. Therefore, the battery temperature has already started increasing acceleratedly, the battery temperature continued rising even after the conduction was made impossible, and the maximum reached temperature was as high as 280° C. This result indicates that because the absolute amount of the particulate polymer that can be included in the conductive intermediate layer is small, a sufficient shutdown effect such that can prevent the thermal ranway caused by overcharge cannot be obtained only with the conductive intermediate layer. Although the shutdown start temperature in the battery of Sample 4 was higher than that in the battery of Sample 3, decrease was found in the maximum reached temperature. This result can be explained as follows. By providing the conductive intermediate layer of the positive electrode with a shutdown function, it was possible to increase the internal resistance of the battery from the earlier stage, thereby inhibiting subsequent accelerated advance of overcharge.

(Samples 5 to 10)

In Samples 5 to 10, lithium ion batteries were constructed by changing the type of the inorganic filler in the heat resistance layer and the amount of the particulate polymer in the conductive intermediate layer in Sample 1, and also changing the type of the particulate polymer and the compounded amount of the particulate polymer in the heat resistance layer of each sample.

Thus, in Samples 5 to 10, the inorganic filler in Sample 1 was changed to boehmite ($D_{50}$=1.2 μm).

Further, the mass ratio of (electrically conductive material):(binder):(particulate polymer) of materials in the conductive intermediate layer was changed to 35:50:15.

The particulate polymer in the heat resistance layer was changed to an ethylene vinyl acetate copolymer with an average particle diameter ($D_{50}$) of 0.5 μm. In addition, an aqueous acrylic binder was used as the binder and water was used as the solvent. The compounded amount of the particulate polymer was changed within a range of the mass ratio of (inorganic filler):(binder):(particulate polymer) of (91 to 46):4:(5 to 50), (Samples 11 to 15)

In Samples 11 to 15, lithium ion batteries were constructed by changing the average particle diameter ($D_{50}$) of the particulate polymer in the heat resistance layer and the types and particle diameters of the electrically conductive material and the particulate polymer in the conductive intermediate layer in Sample 1 and also changing the compounded amount of the particulate polymer in each sample.

Thus, in Samples 11 to 15, the average particle diameter ($D_{50}$) of the particulate polymer in the heat resistance layer in Sample 1 was changed to 1.5 μm, and the compounding ratio was changed to 20% by mass.

The type of the electrically conductive material in the conductive intermediate layer was changed to KS4.

In addition, the particulate polymer in the conductive intermediate layer was changed to the ethylene-vinyl acetate copolymer, the average particle diameter ($D_{50}$) thereof was changed to 1.5 μm, and the compounding ratio of (electrically conductive material):(binder):(particulate polymer) as a mass ratio of the materials was changed within the range of (15 to 42):50:(8 to 35).

[Measurement of Porosity]

The porosity of the separators in Sample 1, Samples 5 to 10, and Samples 11 to 15 was measured in a state with included heat resistance layer. The results are shown in Table

[Measurement of Battery Capacity]

The battery capacity and internal resistance of the lithium ion batteries of Sample 1, Samples 5 to 10, and Samples 11 to 15 were measured.

Thus, the batteries were initially charged to an upper limit voltage of 4.1 V at a current density of 8 A (equivalent to C/3) by a constant current constant voltage method under a temperature condition of 25° C. Then, the battery capacity was measured by performing constant current discharge to a lower limit voltage of 3.0 V at the same current density. The measured values of battery capacity are shown in Table 2.

[Measurement of Internal Resistance]

The internal resistance (IV resistance value) of each battery was measured after measuring the battery capacity. Thus, each battery was constant current discharged to 3.0 V under a temperature condition of 25° C. and then charged at a constant current and a constant voltage to adjust the SOC (State of Charge) to 50%. A discharge pulse current was then applied for 10 sec at 1 C and 25° C., and the voltage after 10 sec was measured. The pulse current was thereafter increased in a stepwise manner in the order of 2 C, 5 C, 10 C with respect to the batteries in which the SOC was again adjusted to 50%, the batteries were alternately charged and discharged, the voltage after 10 sec from the start of each discharge was measured, and the I-V characteristic graph of each battery was plotted. The IV resistance value (mΩ) at 25° C. was calculated from the slope of the I-V characteristic graph. The internal resistance values of the batteries are shown in Table 2.

[Continuous Overcharge Test]

The continuous overcharge test was conducted with respect to the lithium ion batteries of Samples 5 to 10 and Samples 11 to 15 in the same manner as with respect to Sample 1, and the shutdown start temperature and maximum reached temperature (° C.) were measured. The results are shown in Table 2.

TABLE 2

| | Heat resistance layer | | | | | | |
|---|---|---|---|---|---|---|---|
| | Inorganic filter | | | Particulate polymer | | | |
| Sample | Material | $D_{50}$ particle diameter (μm) | Ratio (% by mass) | Material | $D_{50}$ particle diameter (μm) | Ratio (% by mass) | Separator porosity (%) |
| 1 | Alumina | 0.7 | 71 | Polyethylene | 0.8 | 25 | 57 |
| 5 | Boehmite | 1.2 | 91 | Ethylene-vinyl acetate copolymer | 0.5 | 5 | 72 |
| 6 | | | 86 | | | 10 | 69 |
| 7 | | | 76 | | | 20 | 61 |
| 8 | | | 66 | | | 30 | 55 |
| 9 | | | 56 | | | 40 | 31 |
| 10 | | | 46 | | | 50 | 20 |
| 11 | Alumina | 0.7 | 76 | Polyethylene | 1.5 | 20 | 58 |
| 12 | | | | | | | |
| 13 | | | | | | | |
| 14 | | | | | | | |
| 15 | | | | | | | |

| | Conductive intermediate layer | | | | | Test Results | | | |
|---|---|---|---|---|---|---|---|---|---|
| | Electrically conductive material | | Particle polymer | | | | Maximum | Battery characteristics | |
| Sample | Material | Ratio (% by mass) | Material | $D_{50}$ particle diameter (μm) | Ratio (% by mass) | SD start temperature (° C.) | reached temperature (° C.) | Battery capacity (Ah) | Internal resistance (mΩ) |
| 1 | AB | 30 | Polyethylene | 0.3 | 20 | 89 | 120 | 24.3 | 1.9 |
| 5 | AB | 35 | Polyethylene | 0.3 | 15 | 100 | 205 | 24.2 | 1.7 |
| 6 | | | | | | 96 | 135 | 24.2 | 1.9 |
| 7 | | | | | | 92 | 126 | 24.2 | 1.9 |
| 8 | | | | | | 89 | 120 | 24.1 | 2.1 |
| 9 | | | | | | 86 | 118 | 24.0 | 2.3 |
| 10 | | | | | | 84 | 115 | 23.4 | 3.4 |
| 11 | KS4 | 42 | Ethylene-vinyl acetate copolymer | 1.5 | 8 | 95 | 245 | 24.6 | 1.7 |
| 12 | | 40 | | | 10 | 94 | 132 | 24.4 | 1.9 |
| 13 | | 30 | | | 20 | 93 | 120 | 24.2 | 2 |
| 14 | | 20 | | | 30 | 94 | 118 | 24.0 | 2.2 |
| 15 | | 15 | | | 35 | 95 | 115 | 24.0 | 4 |

As shown in Table 2, the results of the continuous overcharge test have confirmed that because the heat resistance layer of the separators and the conductive intermediate layer of the positive electrode in each of the batteries of Sample 1, Samples 5 to 10, and Samples 11 to 15 were provided with the shutdown function demonstrated by the particulate polymer, the maximum reached temperature of the battery was greatly reduced by comparison with that of Samples 2 to 4, and heat generation could be inhibited while effectively controlling the heat generation behavior of the batteries during the overcharge.

It is also clear that an effect of increasing the internal resistance during the abnormal heat generation could be advantageously obtained and the abnormal heat generation could be stopped with a higher safety by setting the ratio of the particulate polymer added to the heat resistance layer and conductive intermediate layer to 10% by mass or higher. Further, it is clear that the sufficient ratio of the particulate polymer added to the heat resistance layer is equal to or less than about 40% by mass, and the sufficient ratio of the particulate polymer added to the conductive intermediate layer is equal to or less than about 30% by mass.

In particular, it is clear that increasing the internal resistance at an early stage in the heat resistance layer of the positive electrode is important in terms of controlling the behavior of the subsequent abnormal heat generation. Further, the internal resistance of the heat resistance layer of the separator can be increased greater than that of the electrode. Those results indicate that the feature of decreasing the current amount at an early stage in the conductive intermediate layer of the positive electrode and then reliably stop the flow of the electric current in the separator is very effective.

Thus, it was confirmed that by setting the amount of the particulate polymer included in the heat resistance layer of the separator and the conductive intermediate layer of the positive electrode in a more adequate range, it was possible to inhibit the maximum reached temperature to a very low range from about 115° C. to 135° C. Thus, it is clear that as a result of providing the particulate polymer more adequately, the location where the shutdown function was demonstrated, the timing thereof, and the effect of the shutdown function were balanced, and the abnormal heat generation could be inhibited safer and with good reliability. Further, the battery characteristics during the usual use did not have to be degraded unnecessarily.

Any of the nonaqueous electrolyte secondary batteries disclosed herein is provided as a battery that is safer and has a high reliability while demonstrating a high energy density characteristic. For example, such batteries have a combination of battery performance and safety that is suitable for batteries to be installed on vehicles and power sources of power storage systems. Therefore, the present invention provides the vehicle 1 equipped with any of the lithium ion batteries 10 (can be also in the form of a battery pack 100 in which a plurality of nonaqueous electrolyte secondary batteries is connected) disclosed herein. In particular, the vehicle (for example, automobile) 1 is provided which includes the nonaqueous electrolyte secondary battery as a power source (typically a power source for a hybrid vehicle, a plug in hybrid vehicle, and a fuel cell vehicle).

INDUSTRIAL APPLICABILITY

The present invention can provide a nonaqueous electrolyte secondary battery which can realize a high output/input density and a high energy density and in which abnormal heat generation can be inhibited more reliably and safely without excessively degrading the battery characteristics.

REFERENCE SIGNS LIST 1 vehicle
10 lithium ion battery
20 wound electrode body (electrode body)
30 positive electrode (positive electrode sheet)
32 positive electrode collector
33 uncoated portion
34 positive electrode active material layer
36 conductive intermediate layer
38 particulate polymer
40 positive electrode terminal
41 positive electrode lead terminal
50 negative electrode sheet (negative electrode)
52 negative electrode collector
53 uncoated portion
54 negative electrode active material layer
60 negative electrode terminal
61 negative electrode lead terminal
70A, 70B separator(s)
72 heat resistance layer
78 particulate polymer
80 battery ease
82 lid
84 container main body
85 gap
86 pouring hole
87 sealing cap
88 safety valve
100 battery pack
WL winding shaft

The invention claimed is:

1. A nonaqueous electrolyte secondary battery, comprising:
   an electrode body including a positive electrode, a negative electrode, and a separator interposed between the positive electrode and the negative electrode; and
   a nonaqueous electrolyte;
   wherein
      the electrode body has a band-shape and is wound to form a wound electrode body,
      the positive electrode comprises a positive electrode collector, a positive electrode active material layer, and a conductive intermediate layer between the positive electrode collector and the positive electrode active material layer, the conductive intermediate layer including an electrically insulating first particulate polymer, a conductive material separate from the electrically insulating first particulate polymer, and a first binder, the conductive intermediate layer having a thickness of less than or equal to 2 μm, and the electrically insulating first particulate polymer having an average particle diameter in a range from 0.1 μm to 3.0 μm,
      the negative electrode comprises a negative electrode collector and a negative electrode active material layer on the negative electrode collector,
      the separator includes a separator main body made of a polyolefin resin having a shutdown function, and a heat resistance layer including an inorganic filler, a second particulate polymer and a second binder on at least one surface of the separator main body,
      a ratio of the electrically insulating first particulate polymer is in the range of from 10% by mass to 30% by mass when the total content ratio of the conductive intermediate layer is 100% by mass,
      a ratio of the second particulate polymer is in the range of from 10% by mass to 40% by mass when the total content ratio of the heat resistance layer is 100% by mass, a melting point of the electrically insulating first particulate polymer and the second particulate polymer is within a temperature range from 80° C. to 120° C. respectively,
      the melting point of the electrically insulating first particulate polymer and the melting point of the second particulate polymer differ from each other, and the melting point of the first particulate polymer is lower than the melting point of the second particulate polymer,
      a melting point of the separator main body is higher than that of the melting point of the second particulate polymer, and
      at least one of the positive electrode active material layer and the negative electrode also includes the electrically insulating first particulate polymer.

2. The nonaqueous electrolyte secondary battery according to claim 1, wherein a $D_{50}$ particle diameter of the inorganic filler contained in the heat resistance layer is 0.5 μm to 5.0 μm, and a $D_{50}$ particle diameter of the electrically insulating first particulate polymer contained in the heat resistance layer is 0.1 μm to 3.0 μm.

3. The nonaqueous electrolyte secondary battery according to claim 1, wherein a porosity of the entire separator is 30% to 70%.

4. A vehicle provided with the nonaqueous electrolyte secondary battery according to claim 1.

* * * * *